United States Patent
McMichael et al.

(10) Patent No.: US 11,176,426 B2
(45) Date of Patent: Nov. 16, 2021

(54) SENSOR OBSTRUCTION DETECTION AND MITIGATION USING VIBRATION AND/OR HEAT

(71) Applicant: Zoox, Inc., Foster City, CA (US)

(72) Inventors: Ryan McMichael, Mountain View, CA (US); Daniel Elliot Schabb, San Francisco, CA (US); Anubhav Thakur, San Francisco, CA (US); Timothy David Kentley-Klay, Stanford, CA (US); Jon Robert Torrey, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 473 days.

(21) Appl. No.: 16/011,335

(22) Filed: Jun. 18, 2018

(65) Prior Publication Data
US 2019/0385025 A1    Dec. 19, 2019

(51) Int. Cl.
*G06K 9/66* (2006.01)
*G06K 9/62* (2006.01)

(52) U.S. Cl.
CPC ............ *G06K 9/66* (2013.01); *G06K 9/627* (2013.01); *G06K 9/6256* (2013.01); *G06K 9/6285* (2013.01)

(58) Field of Classification Search
CPC combination set(s) only.
See application file for complete search history.

(56) References Cited

U.S. PATENT DOCUMENTS

| | | | |
|---|---|---|---|
| 9,278,670 B2 | 3/2016 | Hattori et al. | |
| 9,507,346 B1* | 11/2016 | Levinson | B60W 30/0956 |
| 2015/0034795 A1* | 2/2015 | Polzer | F16F 15/0232 248/550 |
| 2017/0136961 A1* | 5/2017 | Harada | H04N 5/232 |
| 2017/0220876 A1* | 8/2017 | Gao | G06K 9/3241 |
| 2017/0295610 A1 | 10/2017 | Usami et al. | |
| 2018/0081055 A1 | 3/2018 | Guenzel et al. | |
| 2018/0354469 A1* | 12/2018 | Krishnan | G01S 17/931 |
| 2018/0370500 A1* | 12/2018 | Garcia Crespo | G02B 27/0006 |

OTHER PUBLICATIONS

The PCT Search Report and Written Opinion dated Oct. 17, 2019, for PCT Application No. PCT/US2019/037630, 10 pages.

* cited by examiner

*Primary Examiner* — Erin F Bergner
(74) *Attorney, Agent, or Firm* — Lee & Hayes, P.C.

(57) ABSTRACT

A system for detecting and/or mitigating the effects of an obstruction on a surface of a sensor may include a surface configured to receive the sensor, and comprising a sensor window configured to provide a path through which the sensor senses the environment. The system may also include a vibratory actuator configured to facilitate vibration of the sensor window and a heating element configured to heat the sensor window. The system may further include an obstruction detection system configured to detect an obstruction, such as moisture, and an obstruction mitigation controller configured to initiate activation of the vibratory actuator and/or the heating element to mitigate the obstruction. The obstruction detection system may be configured to receive a signal from one or more sensors and detect the obstruction based at least in part on the signal.

19 Claims, 13 Drawing Sheets

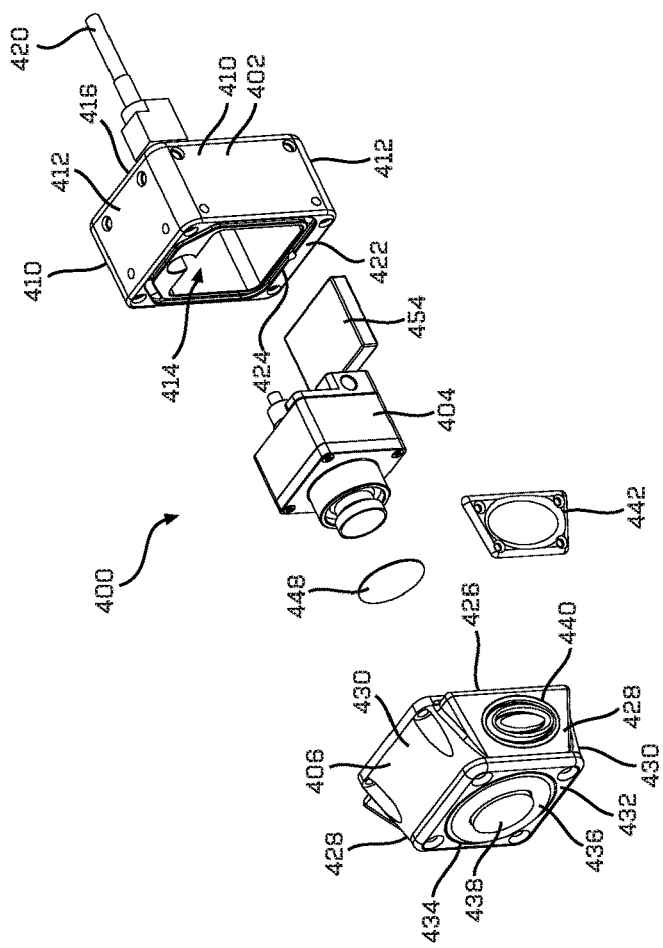
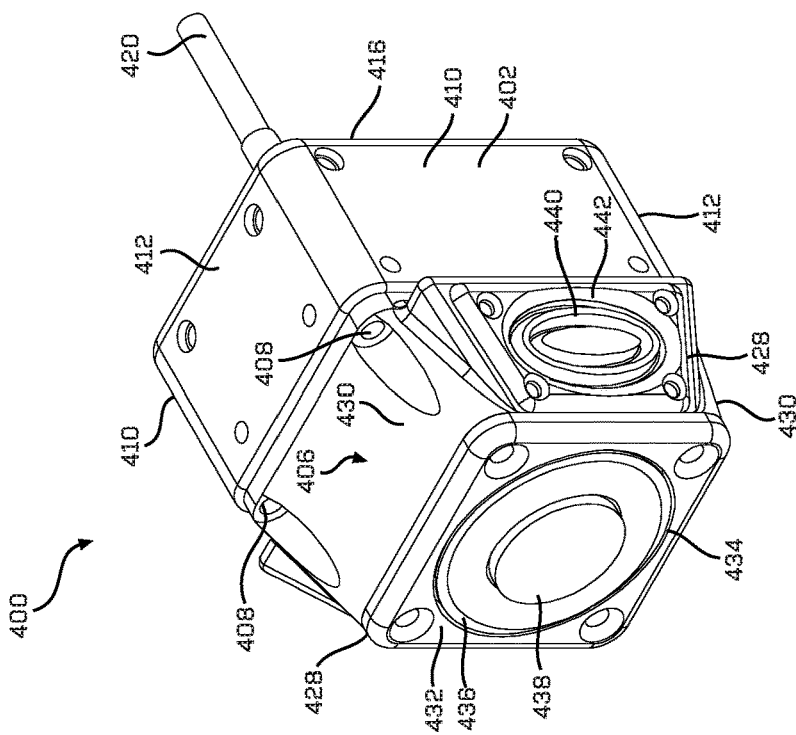
FIG. 4B
FIG. 4A

US 11,176,426 B2

SENSOR OBSTRUCTION DETECTION AND MITIGATION USING VIBRATION AND/OR HEAT

BACKGROUND

Sensors may be used to generate sensor data indicative of objects in an environment. However, the effectiveness of the sensor may be compromised if the operating view of the sensor is partially or completely blocked by an obstruction, such as, for example, water, water droplets, moisture (e.g., rain, snow, ice, condensation, etc.), a partially or fully fogged sensor window, dirt, bird droppings, or bugs. Such obstructions may block a portion of the field of view of the sensor and/or generate sensor data that provides an inaccurate representation of one or more objects present in the environment in which the sensor is located. This situation may be particularly problematic when, for example, the sensor is used to provide sensor data for autonomous operation of a machine without the presence or assistance of an operator that might be able to detect and/or remove the obstruction from the sensor. For example, an autonomous vehicle operating without an operator relies at least in part on data generated by sensors for proper operation. If one or more of the sensors has an obstruction that affects the accuracy of the data generated by the sensor, the autonomous vehicle may take actions based on inaccurate information related to the environment through which it is travelling, such that, for example, the autonomous vehicle may be unable to detect or identify objects, or locate the positions and/or trajectories of objects in the environment. This may hinder operation of such vehicles.

BRIEF DESCRIPTION OF THE DRAWINGS

The detailed description is described with reference to the accompanying figures. In the figures, the left-most digit(s) of a reference number identifies/identify the figure in which the reference number first appears. The same reference numbers in different figures indicate similar or identical items.

FIG. 4A is a perspective view of an example device for mitigating an obstruction from a sensor.

FIG. 4B is an exploded perspective view of the example device shown in FIG. 4A.

DETAILED DESCRIPTION

Figure 1:
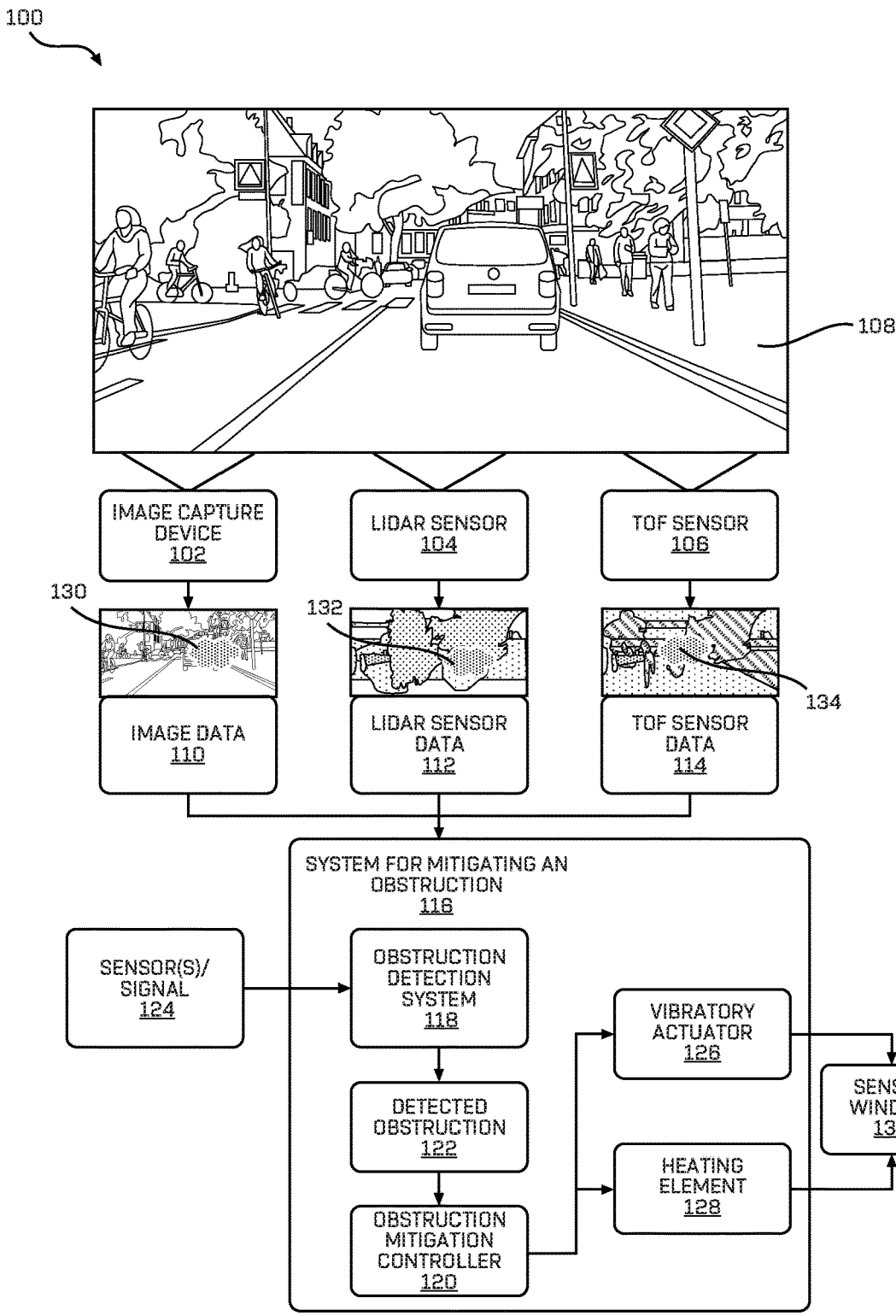
FIG. 1 is a pictorial flow diagram of an example process for detecting and mitigating obstructions from example sensors configured to generate signals indicative of an environment in which the sensors are present.

This disclosure is generally directed to methods, apparatuses, and systems for detecting and/or mitigating the effects of obstructions, such as, for example, water, water droplets, moisture (e.g., rain, snow, ice, condensation, a partially- or fully-fogged sensor window, etc.), dirt, bird droppings, or bugs on sensors configured to capture data representative of an environment (e.g., objects, such as cars, pedestrians, trees, buildings, etc., as well as background, such as road surfaces, sky, etc.). For example, a system may use different ways to detect the presence of an obstruction at least partially obstructing a field of view of the sensor based at least in part on, for example, a signal received from one or more sensors, including, in some examples, the sensor itself. Based at least in part on the detection, the system may initiate a response to mitigate effects of the obstruction or at least partially remove the obstruction from the sensor. In some examples, the system may mitigate the effects by activating a vibratory actuator coupled to the sensor and/or activating a heating element configured to heat a surface associated with the sensor, such as, for example, a sensor window through which the sensor receives a signal indicative of the environment. As a result, the sensor data received from the sensor may be more robust and/or reliable for many applications, such as, for example, operation of an autonomous machine such as an autonomous vehicle. The techniques described herein may additionally or alternatively be applied in contexts other than autonomous machines.

This disclosure is generally directed to a system for mitigating an obstruction associated with a first sensor coupled to an autonomous vehicle. The first sensor may be configured to receive a signal indicative of an environment in which the first sensor is present, and may be an image capture device, such as, for example, one or more cameras (e.g., RGB-cameras, monochrome cameras, intensity (grey scale) cameras, infrared cameras, ultraviolet cameras, depth cameras, stereo cameras, time-of flight (TOF) sensors, and the like), a light detection and ranging (LIDAR) sensor, a radio detection and ranging (RADAR) sensor, one or more ultrasonic transducers, such as a sound navigation and ranging (SONAR) sensor, or another known sensor type. The system may include a surface (e.g., an apparatus housing) configured to be coupled to the first sensor, and a sensor window coupled to the surface and configured to provide a path through which the first sensor senses the environment. The system may also include a vibratory actuator configured to facilitate vibration of the sensor window, and a heating element coupled to one or more of the surface or the sensor window, and configured to heat the sensor window. The system may further include an obstruction detection system including one or more environmental sensors configured to generate an environmental signal indicative of the environment. In some examples, the one or more environmental sensors may include the first sensor, and in some instances, no other sensors. In some examples, the one or more environmental sensors may include one or more sensors other than (or in addition to) the first sensor. In some examples, the obstruction detection system may be configured to receive one or more of the environmental signals or a weather signal indicative of a weather condition. In some examples, the signal indicative of the weather condition may originate from a signal source remote from the system, such as, for example, from a transmission originating from a location remote from the system. The obstruction detection system may also be configured to detect, based at least in part on one or more of the environmental signals or the weather signal, an obstruction associated with the sensor window. For example, the obstruction may partially or completely obstruct a field of view of the first sensor. Such obstructions may include, for example, water, water droplets, moisture (e.g., rain, snow, ice, condensation, a partially- or fully-fogged sensor window, etc.), dirt, bird droppings, or bugs on the first sensor, which may be on an interior surface or an exterior surface of the first sensor. The obstruction may be transparent (e.g., a water-droplet), translucent, or opaque, or a combination thereof.

The system may also include an obstruction mitigation controller configured to initiate activation, based on detection of the obstruction, of one or more of the vibratory actuator or the heating element, wherein the vibratory actuator and the heating element are configured to mitigate the obstruction associated with the sensor window. In some examples, the first sensor is an image sensor, a LIDAR sensor, or a time-of-flight (TOF) sensor.

In some examples, the one or more sensors may include the first sensor, and the obstruction detection system may include a neural network configured to detect the obstruction based at least in part on the signal from the first sensor. For example, the obstruction detection system may be configured to receive the signal from the first sensor, and classify, based at least in part on the signal received from the first sensor, an obstruction on the sensor window. In some such examples, the obstruction mitigation controller may be configured to initiate activation, based at least in part on the classification, of one or more of the vibratory actuator or the heating element.

In some examples, the obstruction detection system may be configured to compare the signal from the first sensor to a localization signal of a localization system configured to determine one or more of a position or orientation of the first sensor based at least in part on one or more of a global positioning system, one or more inertial measurement units (IMUs), a LIDAR sensor, one or more wheel encoders, or one or more image capture devices, such as cameras. Other types of sensors are contemplated. For example, an autonomous vehicle associated with the first sensor (e.g., communicatively coupled to the first sensor) may include a localization system configured to determine one or more of a position or orientation of the autonomous vehicle based at least in part on signals received from one or more sensors coupled to the autonomous vehicle. The system may be configured to compare the one or more signals received from the first sensor with one or more localization signals received from the localization system, and determine whether the first sensor is detecting objects that are represented by the one or more localization signals received from the localization system. Based at least in part on any differences (e.g., differences greater than a threshold magnitude), the system may determine the presence of the obstruction on the surface of the first sensor, for example, that is preventing the first sensor from sensing an object represented by the one or more localization signals. In some examples, this detection of an obstruction may be confirmed or discounted, for example, according to other methods described herein.

In some examples, the first sensor may include a first sensor configured to generate a first signal indicative of one or more objects detectible in an environment in which the first sensor is present. In some such examples, the obstruction detection system may be configured to receive a second signal from a second sensor indicative of one or more objects detectible in the environment, and compare the second signal to the first signal to determine a difference between objects detected by the first sensor and objects detected by the second sensor. For example, the second sensor may detect an object that is not detected by the first sensor, which may be an indication that something is preventing the first sensor from detecting the object, which in turn, may be an indication that at least a portion of the field of view of the first sensor is obstructed by an obstruction that may be on a surface of the first sensor at a position that corresponds, for example, to the object not detected by the first sensor. In some examples, this detection of an obstruction may be confirmed or discounted, for example, according to other methods described herein.

In some examples, the first sensor may include a light detection and ranging (LIDAR) sensor, and the obstruction detection system may be configured to receive a first signal from a light sensor of the LIDAR sensor indicating detection of reflected light from an object stationary relative to the LIDAR sensor. In some examples, the obstruction detection system may be configured to receive a signal indicative of an object and, based at least in part on the signal, determine that the distance to the object is equal to or less than a threshold distance, which may be an indication of an obstruction on the sensor. In some examples, the obstruction detection system may also compare the first signal from the light sensor to one or more second signals received from one or more neighboring sensors of the LIDAR sensor, and determine that the signal from the first light sensor is inconsistent with the one or more second signals. This may be an indication of an obstruction on the first sensor (e.g., on a sensor window through which the first sensor senses the environment). For example, the first signal may be indicative of an object that is stationary, and the second signals may be indicative of detection of an object that is moving (e.g., and the distance to the detected non-moving object is much shorter than the distance to the detected moving object (or indeterminate)), which may be an indication that the non-moving object is an obstruction on the sensor. In some examples, this detection of an obstruction may be confirmed or discounted, for example, according to other methods described herein.

In some examples, the first sensor may include an image capture device, and the signal may include one or more images from the image capture device. In some such examples, the obstruction detection system may be configured to determine one or more features in each of the images, track multiple features through the sequence of images, and detect the obstruction by identifying a feature in the sequence of images that fails to move in a manner consistent with one or more other features of the multiple features. The image capture device may include, for example, one or more cameras (e.g., RGB-cameras, monochrome cameras, intensity (grey scale) cameras, infrared cameras, ultraviolet cameras, depth cameras, stereo cameras, time-of-flight (TOF) cameras, and the like). In some such examples, determining the presence of an obstruction may include identifying the obstruction by identifying a feature in the sequence of images that fails to move in a manner consistent with other features. For example, if a relatively large portion of the features moves through and out of the image sequence in a consistent manner (e.g., because the sensor is moving through the environment), and another feature does not move relative to the sequence of images, it may be an indication that the non-moving feature is an obstruction on the sensor rather than a feature in the environment. In some examples, this detection of an obstruction may be confirmed or discounted, for example, according to other methods described herein.

In some examples, the signal may include a plurality of signals indicative of a scene from the environment, and the obstruction detection system may be configured to segment each signal to create a plurality of segmented signals, and identify, using a perception system for classifying objects, at least one segment in the segmented signals that is stationary relative to the first sensor in a manner inconsistent with one or more other segments in the scene (e.g., the at least one segment is stationary relative to the first sensor while one or more other segments in the scene move relative to the first sensor). For example, the segmentation may be performed by a machine learning network (such as a convolutional neural network (CNN)) or any other process capable of segmenting a scene, and the process may segment and/or categorize all objects detected in a scene. Segmentation (e.g., image segmentation) may be used to partition data representative of an environment into different segments to provide a meaningful representation of the environment. For example, an image may be segmented so as to uniquely identify objects within the image. Image segmentation may be used in a number of different applications. For example, a segmented image associated with a scene in an environment may contain a representation of one or more objects located in the environment. The presence and/or locations of the objects contained in the segmented image may, in turn, be used for obstacle avoidance, object detection and tracking, or the like, for example, in systems using some aspects of machine vision. For example, as explained herein, segmented sensor data may be used by a perception system of an autonomous vehicle to generate vehicle trajectories for operating the autonomous vehicle through the environment. In some examples, this form of detection of an obstruction may be confirmed or discounted, for example, according to other methods described herein.

In some examples, the obstruction mitigation controller may be configured to initiate activation of one or more of the vibratory actuator or the heating element. In some such examples, classifying the obstruction may include determining that following activation of the one or more of the vibratory actuator or the heating element, the signal from the first sensor is indicative of a reduction in size or elimination of an apparent object detected by the first sensor. This may be an indication that the apparent object is an obstruction and that activation of one or more of the vibratory actuator or heating element was at least partially effective at mitigating the obstruction.

In some examples, the obstruction detection system is configured to input the signal into a machine learning network trained to identify an obstruction on the surface of the sensor window. In some examples, the obstruction mitigation controller may be configured to initiate activation of one or more of the vibratory actuator or the heating element based at least in part on a confidence level associated with the identification meeting or exceeding a threshold confidence level. For example, a confidence level associated with the identification of the obstruction may be calculated by the machine learning network, and if the confidence level is below the threshold confidence level, the obstruction mitigation controller may be configured to refrain from initiation activation of the vibratory actuator and/or the heating element. Machine learning generally refers to a broad class of algorithms in which an output is generated based on learned parameters, which will be discussed in detail below. In such examples, the machine learning network may be trained to distinguish obstructions from objects in the environment, for example, via training data correlating one or more sensor signals with obstructions. In identifying obstructions, confidence levels may be associated with the identification of an obstruction, and the system, in some examples, may be configured to initiate the response when a confidence level associated with the identification meets or exceeds a threshold confidence level. For example, a response such as one or more of those described herein may be used to mitigate or at least partially remove the obstruction from the sensor. In some examples, this detection of an obstruction may be confirmed or discounted, for example, according to other methods described herein.

In some examples, the system may be configured to be coupled to an autonomous vehicle, and the obstruction mitigation system may be configured to one or more of initiate communication with a teleoperations system configured to assist with operation of the autonomous vehicle, initiate notification of a vehicle service center regarding the obstruction, or reverse a direction of travel of the vehicle. For example, if the system is unable to sufficiently mitigate or remove the detected obstruction, the teleoperations system may be configured to assist with operation of the autonomous vehicle to overcome any adverse effects to operation of the autonomous vehicle due to the at least partial obstruction of the affected sensor. For example, the autonomous vehicle may be configured to operate according to an assisted mode, wherein a teleoperations system located remotely from the vehicle may receive one or more signals from the autonomous vehicle relating to its operation (e.g., via a communications module and/or a related communications network). For example, the teleoperations system may be configured to detect an obstruction based on the one or more signals received from the autonomous vehicle, for example, via a teleoperator or and/or one or more of the methods described herein. The teleoperations system may be configured to send one or more signals to the autonomous vehicle causing it to initiate a response to mitigate or at least partially remove the obstruction, for example, as described herein. In some examples, the vehicle may be configured to notify a service center for servicing the vehicle to mitigate the obstruction. The service center may take action, such as, for example, to dispatch a service vehicle to meet the autonomous vehicle to assist with mitigating or removing the obstruction, or to instruct the autonomous vehicle to travel to the service center where the obstruction may be mitigated or removed.

In some examples, the autonomous vehicle may be a bi-directional vehicle configured to operate generally with equal performance in either a first direction or a second opposite direction, for example, as described herein. In such examples, the autonomous vehicle may have at least similar sensors at both ends of the vehicle, and the system may be configured to cause the vehicle to operate in the opposite direction of travel if the system determines that an obstruction is affecting operation of one or more of its sensors facing toward (or having a field of view facing) the first direction of travel. This may serve to mitigate the effects of the obstruction until the obstruction can be reduced or at least partially removed from the sensor.

In some examples, the one or more sensors may include one or more sensors configured to detect an ambient condition of the environment in which the first sensor is present. In some such examples, the one or more sensors may include a rain detection sensor, a temperature sensor, a humidity sensor, or a pressure sensor, including the first sensor or independent of the first sensor. In some such examples, the obstruction detection system may be configured to detect the obstruction based at least in part on a signal indicative of one or more of rain detection, temperature outside the autonomous vehicle, temperature inside the housing, humidity outside the autonomous vehicle, humidity inside the housing, pressure outside the autonomous vehicle, or pressure inside the housing. Such data may be consistent with moisture on the surface of the first sensor (e.g., a sensor window), such as, for example, rain, snow, ice, condensation, a partially- or fully-fogged sensor window, etc.

In some examples, the vibratory actuator may include one or more of a voice-coil, a motor, an unbalanced rotational weight, a linear actuator, an ultrasonic transducer, a ring transducer, piezoelectric transducers, pneumatic transducers, MEMS-based transducers, or a rotating magnet. One or more of such example devices may be operable to cause at least a portion of the first sensor, for example, the sensor window, to vibrate, which may result in moisture on the sensor, such as water droplets, reducing in size sufficiently to reduce the amount of obstruction created by the water droplets, thereby mitigating the obstruction created by the moisture.

In some examples, the system may also include a diaphragm coupling the sensor window to the surface. In some such examples, the diaphragm may be flexible, and altering the pressure inside the housing may result in the sensor window vibrating as the diaphragm allows the sensor window to vibrate relative to the housing.

In some examples, the first sensor may be configured to receive the signal indicative of the environment at a sensor frequency. In some such examples, the obstruction mitigation controller may be configured to initiate activation of the vibratory actuator based at least in part on the sensor frequency. For example, the activation may occur at multiples of the sensor frequency. In some examples, the obstruction mitigation controller may be configured to initiate activation of the vibratory actuator in a manner temporally aligned with the sensor frequency. This may, in some examples, result in vibration of the sensor window occurring at multiples of the sensor frequency. This may prevent moving artifacts created by reflections in the sensor window changing position relative to the sensor signal receiver. In particular, if the vibrations occur at varying times relative to the times at which the sensor receives signals, the relative displacement of the sensor window may result in reflections moving relative to the sensor signal receiver. In some examples, timing the vibrations to coincide with the time (or multiples of the time) at which the sensor receives signals may result in the reflections not moving relative to consecutive times at which the sensor receives the sensor signals. For example, the first sensor may include an image capture device operable at a framerate frequency (e.g., 30 Hz), and the obstruction mitigation controller may be configured to initiate activation of the vibratory actuator based at least in part on the framerate frequency.

As noted above, in some examples, the obstruction detection system may be configured to identify water droplets on the sensor window. In some such examples, the obstruction detection system may be configured to initiate activation of the vibratory actuator at a frequency based at least in part on the size of the water droplets. For example, if the water droplets are relatively larger, the obstruction detection system may be configured to initiate activation of the vibratory actuator at a relatively lower frequency, for example, to reduce the size of the water droplets. If the water droplets are relatively smaller, the obstruction detection system may be configured to initiate activation of the vibratory actuator at a relatively higher frequency to reduce the size of the water droplets. In some examples, if the water droplets are relatively larger, the obstruction detection system may be configured to initiate activation of the vibratory actuator at a relatively higher frequency to reduce the size of the water droplets.

In some examples, the obstruction mitigation controller may be configured to initiate activation of the vibratory actuator in a pulsing manner (e.g., intermittently). In some examples, this may improve the effectiveness of the obstruction mitigation. In some examples, the obstruction mitigation controller may be configured to initiate activation of the vibratory actuator according to a pulsed waveform, for example, rather than a continuous waveform. In some examples, the pulsed waveform may include one or more of a sine wave, a saw wave, a square wave, etc. In some examples, the obstruction mitigation controller may be configured to initiate activation of the vibratory actuator to initiate a surface wave (e.g., a surface acoustic wave (SAW)) associated with the sensor window. For example, the surface wave may include one or more of a lamb wave, a sine wave, a saw wave, a square wave, etc.

In some examples, the system may also include one or more of an active noise reduction actuator or a passive noise suppressor coupled to the surface and which may be configured to reduce noise generated by operation of the vibratory actuator. For example, the active noise reduction actuator may include a magnetic coil configured to generate a pressure pulse to actively suppress noise generated by operation of the vibratory actuator. In some examples, the active noise reduction may be provided by phase offset of different actuators, for example, based on a distance to the vehicle (e.g., small scale vox). The passive noise suppressor may include, for example, a pressure relief valve coupled to the housing, for example, to reduce noise generated by operation of the vibratory actuator.

In some examples, the heating element may include one or more of a metal heating element, a ceramic heating element, a thin-film heating element, or an indium tin oxide layer, for example, on a surface of the first sensor and/or sensor window.

The techniques and systems described herein may be implemented in a number of ways. Example implementations are provided below with reference to the figures.

FIG. 1 is a pictorial flow diagram of an example process 100 for detecting and mitigating (e.g., reducing and/or removing) obstructions from example sensors configured to generate signals indicative of an environment in which the sensors are present. In the example shown, example sensors include an image capture device 102, a LIDAR sensor 104, and a time-of-flight (TOF) sensor 106. Although the image capture device 102, LIDAR sensor 104, and TOF sensor 106 are described herein with respect to this example, other sensor types configured to generate signals indicative of an environment (which may include, for example, one or more objects) are contemplated, such as, for example, radio detection and ranging (RADAR) sensors and ultrasonic transducers, such as sound navigation and ranging (SONAR) sensors, as well as other sensors.

The image capture device 102, the LIDAR sensor 104, and the TOF sensor 106 may be coupled to a vehicle travelling through the environment 108. For example, the vehicle may be an autonomous vehicle, such as the example vehicle described herein with respect to FIG. 2. The image capture device 102 may be any type of image capture device configured to capture images representative of the environment 108, such as, for example, one or more cameras (e.g., RGB-cameras, monochrome cameras, intensity (grey scale) cameras, infrared cameras, ultraviolet cameras, depth cameras, stereo cameras, time-of-flight (TOF) cameras, and the like), and the LIDAR sensor 104 may be any type of LIDAR sensor. Some examples may include only a single type of sensor or any combination of different types of sensors configured to generate data representative of the environment 108. Further, though depicted as single sensors for illustrative purposes, any number of image capture device(s) 102, LIDAR sensor(s) 104, or TOF sensor(s) 106 are contemplated.

In the example shown in FIG. 1, the image capture device 102 is depicted as capturing image data 110 in the form of one or more signals corresponding to one or more images representative of the environment 108.

The example LIDAR sensor 104 shown in FIG. 1 is depicted as capturing LIDAR sensor data 112 in the form of one or more signals representative of the environment 108. In some examples (e.g., those examples where one or more spinning LIDAR are used), the LIDAR sensor data 112 may correspond to multiple sweeps (e.g., rotations) of the LIDAR sensor 104 over time, one or more sweeps of multiple LIDAR sensors, and/or measurements from one or more LIDAR sensor(s) 104 over a period of time. For example, the LIDAR sensor 104 may be configured such that the one or more sensors are mounted to spin (e.g., about an axis), thereby causing the lasers to sweep through, for example, 360 degrees, to capture LIDAR sensor data 112 associated with the environment 108. For example, the LIDAR sensor 104 may have a light emitter and a light sensor, with the light emitter including one or more lasers that direct highly focused light toward an object or surface, which reflects the light back to the light sensor, though any other light emission and detection to determine range is contemplated (e.g., flash LIDAR, MEMS LIDAR, solid state LIDAR, and the like). Measurements of the LIDAR sensor 104 may be represented as three-dimensional LIDAR sensor data 112 having coordinates (e.g., Cartesian, polar, etc.) corresponding to positions or distances captured by the LIDAR sensor 104 and/or azimuth and elevation angles with corresponding ranges. For example, the three-dimensional LIDAR sensor data 112 may include a three-dimensional map or point cloud, which may be represented as a plurality of vectors emanating from a light emitter and terminating at an object or surface. In some examples, converting operations may be used to convert the three-dimensional LIDAR sensor data 112 to multi-channel two-dimensional data. In some examples, the LIDAR sensor data 112 may be automatically segmented, and the segmented LIDAR sensor data 112 may be used, for example, as input for determining trajectories for an autonomous vehicle.

The example TOF sensor 106 shown in FIG. 1 may be configured to capture TOF sensor data 114 in the form of one or more signals representative of the environment 108. In some examples, the TOF sensor data 114 may be fused to generate a more complete or accurate representation of the environment 108.

In some examples, any one or more of the data sources (e.g., image data 110, LIDAR sensor data 112, and/or TOF sensor data 114) may be fused (e.g., with additional sensor data of the same modality and/or other sensor data of different modalities (e.g., LIDAR data 104, TOF sensor data 114, etc.)) to generate a more complete or accurate representation of the environment 108.

In some examples, the image capture device 102, the LIDAR sensor 104, and/or the TOF sensor 106 may capture different fields of view relative to the environment 108. In some examples, the image data 110, the LIDAR sensor data 112, and/or the TOF sensor data 114 may be aligned, for example, according to known alignment techniques (e.g., pose transformations).

As shown in FIG. 1, the example process 100 may include communicating the image data 110, the LIDAR sensor data 112, and/or the TOF sensor data 114 (in addition to any other sensor data) to a system for mitigating an obstruction 116, which may be configured to detect an obstruction partially or completely obstructing the field of view of any sensor associated with the transmitted data (e.g., the image capture device 102, the LIDAR sensor 104, and/or the TOF sensor 106). In some examples, the system for mitigating an obstruction 116 may also be configured to mitigate effects of the obstruction and/or at least partially remove the obstruction from the respective sensor. For example, the example system for mitigating an obstruction 116 shown in FIG. 1 includes an obstruction detection system 118 configured to receive one or more signals from the image capture device 102, the LIDAR sensor 104, or the TOF sensor 106 and determine, based at least in part on the one or more signals, the presence of an obstruction on a surface of one or more of the image capture device 102, the LIDAR sensor 104, or the TOF sensor 106, for example, as described herein. Some examples of the system for mitigating an obstruction 116 may include an obstruction mitigation controller 120, and in some such examples, when the obstruction detection system 118 determines the presence of an obstruction, one or more signals indicative of the detected obstruction 122 may be communicated to the obstruction mitigation controller 120, which may be configured to initiate a response, based at least in part on the one or more signals indicative of the detected obstruction 122, to mitigate the effects of the obstruction and/or at least partially remove the obstruction from the respective sensor as explained herein.

In some examples of the process 100, the obstruction detection system 118 may be configured to receive one or more signals from one or more sensors 124 configured to generate signals indicative of an ambient condition in the environment 108 in which one or more of the image capture device 102, LIDAR sensor 104, or TOF sensor 106 is/are present. For example, the one or more sensors 108 may include one or more of a rain detection sensor, a temperature sensor, a humidity sensor, or a pressure sensor. In some such examples, the obstruction detection system 118 may be configured to detect an obstruction of one or more of the image capture device 102, LIDAR sensor 104, or TOF sensor 106 based at least in part on a signal indicative of one or more of rain detection, temperature outside the vehicle, humidity outside the vehicle, or pressure outside the vehicle. Based on the ambient conditions, the obstruction detection system may determine that there is an obstruction in the form of moisture on the surface of one or more of the sensors mounted on the vehicle. In some examples, the one or more sensors 124 may be located remotely from the vehicle and the sensors mounted on the vehicle, and the signals may originate from a source located remotely from the vehicle. For example, a third party may transmit one or more signals 124 indicative of rain, fog, ice, and/or snow present at the location of the vehicle. The third party, in some examples, may be a teleoperations system in communication with the vehicle, for example, as described herein. Based on such signals 124, the obstruction detection system 118 may be configured to determine the presence of an obstruction on a surface of one or more of the sensors mounted on the vehicle.

In the example process 100 shown FIG. 1, the obstruction mitigation controller 120 of the example system for mitigating an obstruction 116 is also configured to initiate a correction action intended to mitigate the effects of the obstruction and/or at least partially remove the obstruction from one or more of the sensors 102, 104, or 106. For example, the example system for mitigating an obstruction 116 includes a vibratory actuator 126 and a heating element 128, each configured to mitigate (e.g., reduce or remove) the obstruction on the surface of one or more of the sensors mounted on the vehicle.

For example, as shown in FIG. 1, each of the image capture device 102, the LIDAR sensor 104, and the TOF sensor 106 has a respective obstruction 130, 132, and 134, as schematically depicted in the image data 110, the LIDAR sensor data 112, and the TOF sensor data 114 shown in FIG. 1. The image data 110, the LIDAR sensor data 112, and the TOF sensor data 114 are communicated to the example system for mitigating an obstruction 116, and the obstruction detection system 118 may use one or more of the example techniques described herein to determine that there is an obstruction on the surface of the image capture device 102, the LIDAR sensor 104, and the TOF sensor 106. In some examples, the obstruction detection system 118 may use one or more of the techniques described in U.S. Non-provisional patent application Ser. No. 15/837,953, filed Dec. 11, 2017, and/or U.S. Non-provisional patent application Ser. No. 15/944,240, filed Apr. 3, 2018, the disclosures of both of which are incorporated herein by reference, to determine that there is an obstruction on the surface of the image capture device 102, the LIDAR sensor 104, and the TOF sensor 106. In some examples, the surface of the image capture device 102, the LIDAR sensor 104, and/or the TOF sensor 106 may include a sensor window 136, which may be either an integral part of the associated sensor or a part separate from the associated sensor, and may include any material and/or medium through which an associated sensor may receive a signal indicative of the environment, and thus, may include, but is not limited to, transparent materials, translucent materials, glass, polymers, polycarbonates, and/or combinations thereof. In examples including sensor types such as RADAR, SONAR, and/or other non-optical sensor types, the sensor window may be opaque and transmissive to signals transmitted and/or received by the sensor. For the purpose of illustration, each of the image capture device 102, the LIDAR sensor 104, and TOF sensor 106 shown in FIG. 1 have an obstruction, but it is contemplated that any number of such devices may have an obstruction (or obstructions). The detected obstruction 122 may be communicated to the obstruction mitigation controller 120, which may in turn, communicate a corrective action to, for example, one or more of the vibratory actuator 126 or the heating element 128 to mitigate the effects of the obstruction and/or at least partially remove the obstruction from the affected sensor(s).

Figure 2:
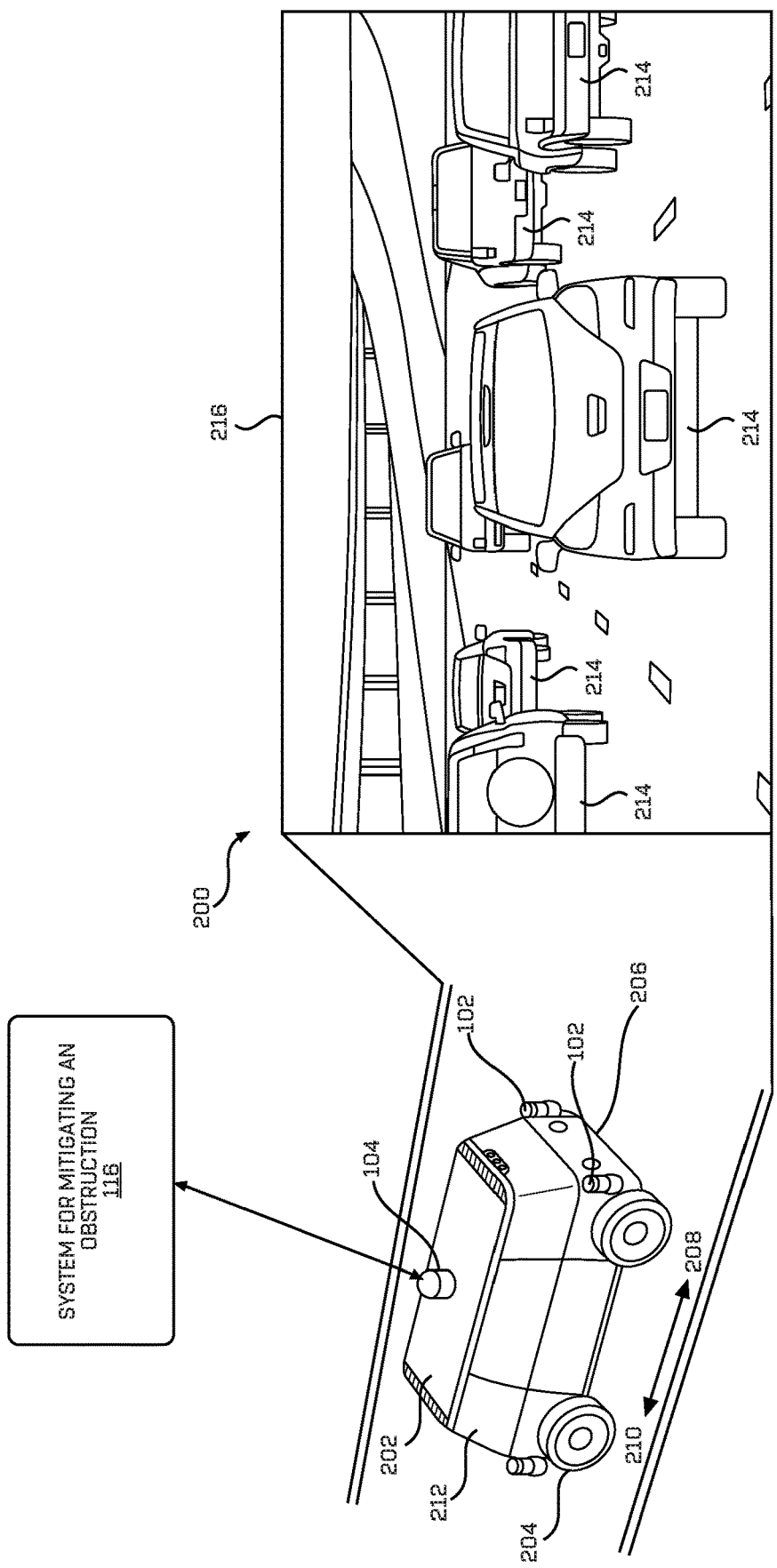
FIG. 2 is an example environment through which an example vehicle is travelling and capturing sensor data.

FIG. 2 shows an example environment 200 through which an example vehicle 202 is traveling. The example vehicle 202 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 202 may be configured to control all functions from start to completion of the trip, including all parking functions, it may not include a driver and/or controls for driving the vehicle 202, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times to those that are partially or fully autonomously controlled.

The example vehicle 202 may be any configuration of vehicle, such as, for example, a van, a sport utility vehicle, a cross-over vehicle, a truck, a bus, an agricultural vehicle, and a construction vehicle. The vehicle 202 may be powered by one or more internal combustion engines, one or more electric motors, hydrogen power, any combination thereof, and/or any other suitable power sources. Although the example vehicle 202 has four wheels 204, the systems and methods described herein may be incorporated into vehicles having fewer or a greater number of wheels, tires, and/or tracks. In some examples, the vehicle 202 may be a bi-directional vehicle. For example, the vehicle 202 may have four-wheel steering and may operate generally with equal performance characteristics in all directions, for example, such that a first end 206 of the vehicle 202 is the front end of the vehicle 202 when travelling in a first direction 208, and such that the first end 206 becomes the rear end of the vehicle 202 when traveling in the opposite, second direction 210, as shown in FIG. 2. Similarly, a second end 212 of the vehicle 202 is the front end of the vehicle 202 when travelling in the second direction 210, and such that the second end 212 becomes the rear end of the vehicle 202 when traveling in the opposite, first direction 208. These example characteristics may facilitate greater maneuverability, for example, in small spaces or crowded environments, such as parking lots and urban areas.

The vehicle 202 may travel through the environment 200, relying at least in part on sensor data indicative of objects in the environment 200 in order to determine trajectories of the vehicle 202. For example, as the vehicle 202 travels through the environment 200, one or more image capture devices 102, LIDAR sensors 104, and/or other types of sensors (e.g., TOF sensors 106) capture data associated with detected objects (e.g., vehicles 214 shown in FIG. 2, and/or pedestrians, buildings, barriers, etc.) in a field of view 216 of one or more of the sensors. The data captured may be used, for example, as input for determining trajectories for the vehicle 202. As schematically depicted in FIG. 2, the vehicle 202 may include a system for mitigating an obstruction 116 configured detect an obstruction partially or completely obstructing the field of view of one or more of the sensors (e.g., the image capture device(s) 102, the LIDAR sensor(s) 104, and/or the TOF sensor(s) 106), and in some examples, mitigate effects of the obstruction and/or at least partially remove the obstruction from the surface of the affected sensor.

Figure 3:
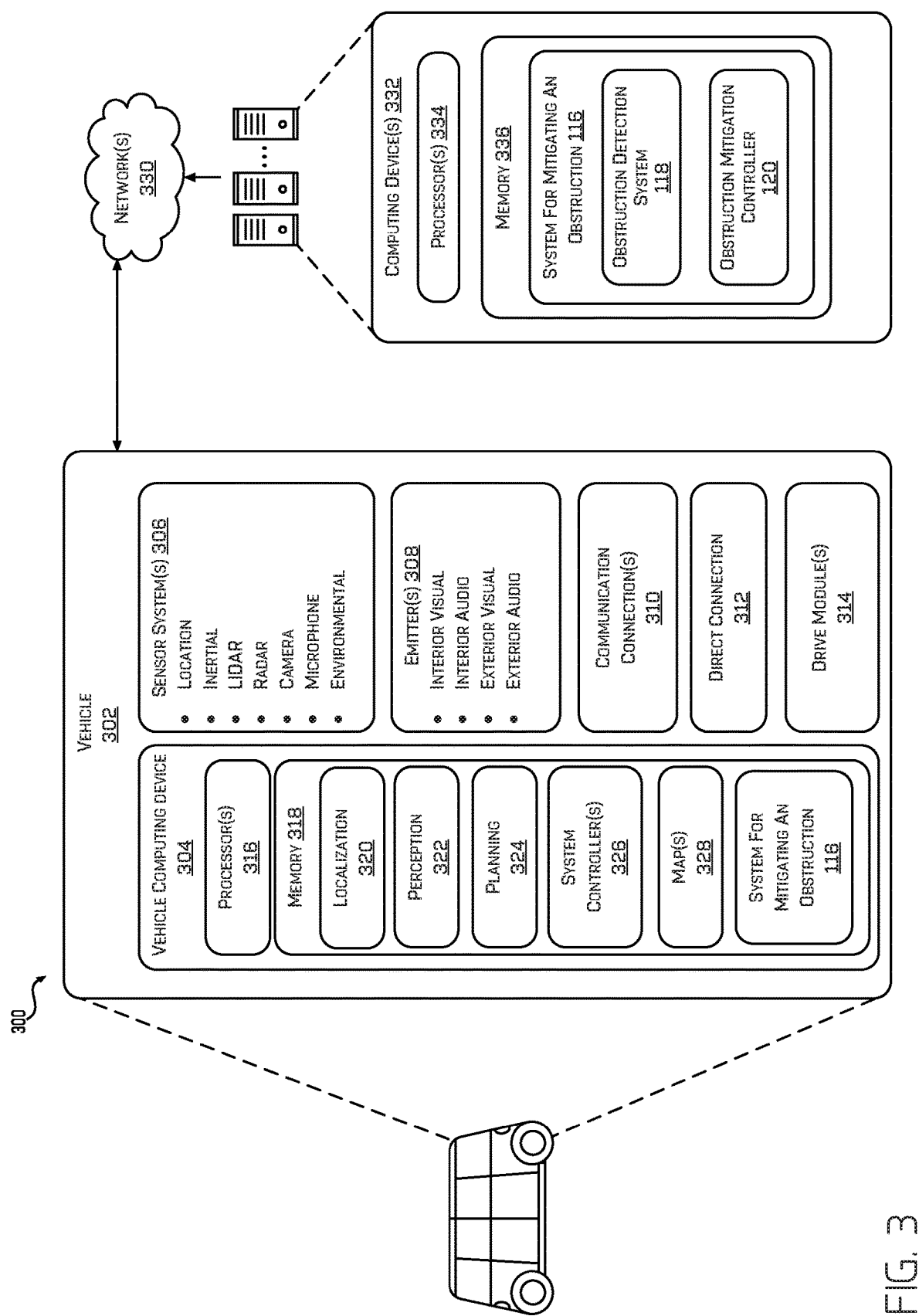
FIG. 3 is a block diagram of an example system for implementing the techniques described herein.

FIG. 3 depicts a block diagram of an example system 300 for implementing the techniques described herein. In at least some examples, the system 300 may include a vehicle 302, which may correspond to the example vehicle 202 shown in FIG. 2. The vehicle 302 may include a vehicle computing device 304, one or more sensor systems 306, one or more emitters 308, one or more communication connections 310, at least one direct connection 312, and one or more drive modules 314.

The vehicle computing device 304 may include one or more processors 316 and memory 318 communicatively coupled with the one or more processors 316. In the illustrated example, the vehicle 302 is an autonomous vehicle. However, the vehicle 302 may be any other type of vehicle. In the illustrated example, the memory 318 of the vehicle computing device 304 stores a localization component 320, a perception component 322, a planning component 324, one or more system controllers 326, one or more maps 328, and an example system for mitigating an obstruction 116. Though depicted in FIG. 3 as residing in memory 318 for illustrative purposes, it is contemplated that the localization component 320, the perception component 322, the planning component 324, the one or more system controllers 326, the one or more maps 328, and the system for mitigating an obstruction 116 may additionally, or alternatively, be accessible to the vehicle 302 (e.g., stored on, or otherwise accessible by, memory remote from the vehicle 302).

In at least one example, the localization component 320 may be configured to receive data from the sensor system(s) 306 to determine a position and/or orientation of the vehicle 302 (e.g., one or more of an x-, y-, z-position, roll, pitch, or yaw). For example, the localization component 320 may include and/or request/receive a map of an environment and may continuously determine a location and/or orientation of the autonomous vehicle within the map. In some examples, the localization component 320 may utilize SLAM (simultaneous localization and mapping), CLAMS (calibration, localization and mapping, simultaneously), relative SLAM, bundle adjustment, non-linear least squares optimization, or the like to receive image data, LIDAR sensor data, radar data, IMU data, GPS data, wheel encoder data, and the like to accurately determine a location of the autonomous vehicle. In some examples, the localization component 320 may provide data to various components of the vehicle 302 to determine an initial position of an autonomous vehicle for generating a candidate trajectory, as discussed herein.

In some examples, the perception component 322 may be configured to perform object detection, segmentation, and/or classification. In some examples, the perception component 322 may provide processed sensor data that indicates a presence of an entity that is proximate to the vehicle 302 and/or a classification of the entity as an entity type (e.g., car, pedestrian, cyclist, animal, building, tree, road surface, curb, sidewalk, unknown, etc.). In additional and/or alternative examples, the perception component 322 may provide processed sensor data that indicates one or more characteristics associated with a detected entity and/or the environment in which the entity is positioned. In some examples, characteristics associated with an entity may include, but are not limited to, an x-position (global position), a y-position (global position), a z-position (global position), an orientation (e.g., a roll, pitch, yaw), an entity type (e.g., a classification), a velocity of the entity, an acceleration of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

In general, the planning component 324 may determine a path for the vehicle 302 to follow to traverse through an environment. For example, the planning component 324 may determine various routes and trajectories and various levels of detail. For example, the planning component 324 may determine a route to travel from a first location (e.g., a current location) to a second location (e.g., a target location). For the purpose of this discussion, a route may be a sequence of waypoints for travelling between two locations. As non-limiting examples, waypoints include streets, intersections, global positioning system (GPS) coordinates, etc. Further, the planning component 324 may generate an instruction for guiding the autonomous vehicle along at least a portion of the route from the first location to the second location. In at least one example, the planning component 324 may determine how to guide the autonomous vehicle from a first waypoint in the sequence of waypoints to a second waypoint in the sequence of waypoints. In some examples, the instruction may be a trajectory or a portion of a trajectory. In some examples, multiple trajectories may be substantially simultaneously generated (e.g., within technical tolerances) in accordance with a receding horizon technique, wherein one of the multiple trajectories is selected for the vehicle 302 to navigate.

In at least one example, the planning component 324 may determine a location of a user based on image data of an environment received from the user using, for example, bags of binary words with image based features, artificial neural network, and the like. Further, the planning component 324 may determine a pickup location associated with a location. A pickup location may be a specific location (e.g., a parking space, a loading zone, a portion of a ground surface, etc.) within a threshold distance of a location (e.g., an address or location associated with a dispatch request) where the vehicle 302 may stop to pick up a passenger. In at least one example, the planning component 324 may determine a pickup location based at least in part on determining a user identity (e.g., determined via image recognition or received as an indication from a user device, as discussed herein).

In at least one example, the vehicle computing device 304 may include one or more system controllers 326, which may be configured to control steering, propulsion, braking, safety, emitters, communication, and other systems of the vehicle 302. These system controller(s) 326 may communicate with and/or control corresponding systems of the drive module(s) 314 and/or other components of the vehicle 302.

The memory 318 may further include one or more maps 328 that may be used by the vehicle 302 to navigate within the environment. For the purpose of this discussion, a map may be any number of data structures modeled in two dimensions, three dimensions, or N dimensions that are capable of providing information about an environment, such as, but not limited to, topologies (such as intersections), streets, mountain ranges, roads, terrain, and the environment in general. In some examples, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the map may be stored in a tiled format, such that individual tiles of the map represent a discrete portion of an environment, and may be loaded into working memory as needed. In at least one example, the one or more maps 328 may include at least one map (e.g., images and/or a mesh). In some example, the vehicle 302 may be controlled based at least in part on the maps 328. That is, the maps 328 may be used in connection with the localization component 320, the perception component 322, and/or the planning component 324 to determine a location of the vehicle 302, identify objects in an environment, and/or generate routes and/or trajectories to navigate within an environment.

In some examples, the one or more maps 328 may be stored on a remote computing device(s) (such as the computing device(s) 332) accessible via network(s) 330. In some examples, multiple maps 328 may be stored based on, for example, a characteristic (e.g., type of entity, time of day, day of week, season of the year, etc.). Storing multiple maps 328 may have similar memory requirements, but increase the speed at which data in a map may be accessed.

As shown in FIG. 3, in some examples, the system for mitigating an obstruction 116 may be stored in the memory 318 of the computing device 304 of the vehicle 302 or remote from the vehicle 302 in the memory 336 of the computing device(s) 332. In some examples, some portions of the system for mitigating an obstruction 116 may be stored in the memory 318 of the computing device 304 of the vehicle 302, and other portions of the system for mitigating an obstruction 116 may be stored remotely in the memory 336 of the computing device(s) 332, and the separately located portions of the system for mitigating an obstruction 116 may operate together in a coordinated manner.

In some examples, aspects of some or all of the components discussed herein may include any models, algorithms, and/or machine learning algorithms. For example, in some examples, the components in the memory 318 and/or the memory 336 may be implemented as a neural network.

As described herein, an exemplary neural network is a biologically inspired algorithm which passes input data through a series of connected layers to produce an output. Each layer in a neural network may also include another neural network, or may include any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks, such as, for example, ResNet70, ResNet101, VGG, DenseNet, PointNet, and the like.

In at least one example, the sensor system(s) 306 may include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time-of-flight (TOF), etc.), microphones, wheel encoders, environment sensors (e.g., temperature sensors, humidity sensors, light sensors, pressure sensors, etc.), etc. The sensor system(s) 306 may include multiple examples of each of these or other types of sensors. For example, the LIDAR sensors may include individual LIDAR sensors located at the corners, front, back, sides, and/or top of the vehicle 302. As another example, the camera sensors may include multiple cameras disposed at various locations about the exterior and/or interior of the vehicle 302. The sensor system(s) 306 may provide input to the vehicle computing device 304. Additionally, or alternatively, the sensor system(s) 306 may send sensor data, via the one or more networks 330, to the one or more computing device(s) at a particular frequency, after a lapse of a predetermined period of time, in near real-time, etc.

The vehicle 302 may also include one or more emitters 308 for emitting light and/or sound, as described above. The emitters 308 in this example include interior audio and visual emitters to communicate with passengers of the vehicle 302. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 308 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which including acoustic beam steering technology.

The vehicle 302 may also include one or more communication connection(s) 310 that enable communication between the vehicle 302 and one or more other local or remote computing device(s). For example, the communication connection(s) 310 may facilitate communication with other local computing device(s) on the vehicle 302 and/or the drive module(s) 314. Also, the communication connection(s) 310 may allow the vehicle to communicate with other nearby computing device(s) (e.g., other nearby vehicles, traffic signals, etc.). The communications connection(s) 310 also enable the vehicle 302 to communicate with a remote teleoperations computing device or other remote services.

The communications connection(s) 310 may include physical and/or logical interfaces for connecting the vehicle computing device 304 to another computing device or a network, such as network(s) 330. For example, the communications connection(s) 310 may enable Wi-Fi-based communication, such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 302 may include one or more drive modules 314. In some examples, the vehicle 302 may have a single drive module 314. In at least one example, if the vehicle 302 has multiple drive modules 314, individual drive modules 314 may be positioned on opposite ends of the vehicle 302 (e.g., the front and the rear, etc.). In at least one example, the drive module(s) 314 may include one or more sensor systems to detect conditions of the drive module(s) 314 and/or the surroundings of the vehicle 302. By way of example and not limitation, the sensor system(s) may include one or more wheel encoders (e.g., rotary encoders) to sense rotation of the wheels (e.g., wheels 204 FIG. 2) of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, radar sensors, etc. Some sensors, such as the wheel encoders may be unique to the drive module(s) 314. In some cases, the sensor system(s) on the drive module(s) 314 may overlap or supplement corresponding systems of the vehicle 302 (e.g., sensor system(s) 306).

The drive module(s) 314 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 314 may include a drive module controller, which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive module(s) 314. Furthermore, the drive module(s) 314 also include one or more communication connection(s) that enable communication by the respective drive module with one or more other local or remote computing device(s).

In at least one example, the direct connection 312 may provide a physical interface to couple the one or more drive module(s) 314 with the body of the vehicle 302. For example, the direction connection 312 may allow the transfer of energy, fluids, air, data, etc. between the drive module(s) 314 and the vehicle 302. In some examples, the direct connection 312 may further releasably secure the drive module(s) 314 to the body of the vehicle 302.

In at least one example, the localization component 320, perception component 322, the planning component 324, and/or the system for mitigating an obstruction 116 may process sensor data, as described above, and may send their respective outputs, over the one or more network(s) 330, to one or more computing device(s) 332. In at least one example, the localization component 320, the perception component 322, the planning component 324, and/or the system for mitigating an obstruction 116 may send their respective outputs to the one or more computing device(s) 332 at a particular frequency, after a lapse of a predetermined period of time, in near real-time, etc.

The processor(s) 316 of the vehicle 302 and/or the processor(s) 334 of the computing device(s) 332 may be any suitable processor capable of executing instructions to process data and perform operations as described herein. By way of example and not limitation, the processor(s) 316 and 334 may include one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 318 and 336 are examples of non-transitory computer-readable media. The memory 318 and 336 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 3 is illustrated as a distributed system, in alternative examples, components of the vehicle 302 may be associated with the computing device(s) 332, and/or components of the computing device(s) 332 may be associated with the vehicle 302. That is, the vehicle 302 may perform one or more of the functions associated with the computing device(s) 332, and vice versa.

FIGS. 1 and 6-11 illustrate example processes in accordance with example embodiments of this disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. The numbering in the drawings is intended to orient a reader to one possible order of operations, but is not intended to be construed as a limitation, as discussed herein.

Figure 4C:
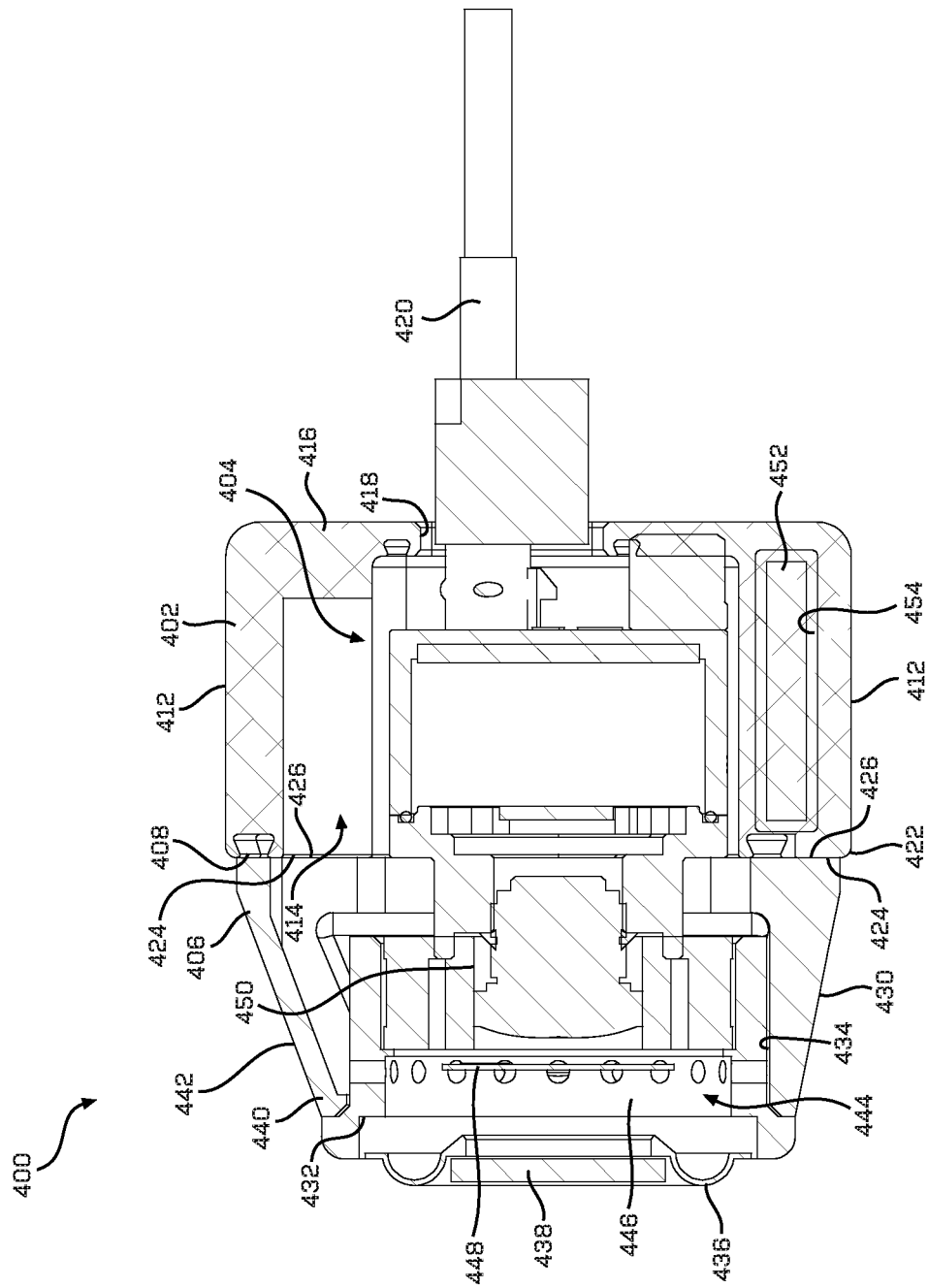
FIG. 4C is a partial side section view of the example device shown in FIGS. 4A and 4B.

FIGS. 4A, 4B, and 4C show an example apparatus 400 for mitigating an obstruction on a surface of a sensor. The example apparatus 400 for mitigating an obstruction includes a sensor housing 402 configured to house one or more sensors 404, which may include one or more image capture devices, LIDAR sensors, and/or TOF sensors (e.g., such as one or more of the sensors 102, 104, and/or 106 described herein), though any other sensor is contemplated. The example apparatus 400 for mitigating an obstruction shown also includes an apparatus housing 406 coupled to the sensor housing 402, for example, by fasteners 408. As shown, the example sensor housing 402 includes a first pair of opposing sidewalls 410 coupled to one another by a second pair of opposing sidewalls 412 to form a cavity 414 (FIGS. 4B and 4C) in which the one or more sensors 404 are received. As shown in FIG. 4C, the example sensor housing 402 includes an end wall 416 substantially closing one end of the cavity 414 and defining an aperture 418 through which an interface cable 420 extends. The interface cable 420, in some examples, is configured to provide a communication link between the apparatus 400 for mitigating an obstruction and other portions of the vehicle. In some examples, the apparatus 400 for mitigating an obstruction on a surface of a sensor may be integrally formed with the one or more sensors 404.

In the example shown, the sensor housing 402 defines an open end 422 opposite the end wall 416. An edge 424 of the open end 422 of the sensor housing 402 defines a face configured to abut a complimentary face of an edge 426 of the apparatus housing 406. In some examples, the faces may be configured to receive a seal, such as, for example, a gasket and/or sealant, to provide a substantially fluid-tight seal between the faces of the respective edges 424 and 426. In the example shown, each of the sensor housing 402 and the apparatus housing 406 defines a substantially rectangular cross-section (e.g., a substantially square cross-section) having four corners. In some examples, the sensor housing 402 and the apparatus housing 406 may be coupled to one another via the fasteners 408 (e.g., bolts) at each of the four corners. Other housing shapes and types of fasteners are contemplated, and in some examples, the sensor housing 402 and apparatus housing 406 may be coupled to one another via adhesives and/or welding. Further, in at least some examples, the sensor housing 402 and the apparatus housing 406 may be integrally formed.

In the example shown in FIGS. 4A-4C, the apparatus housing 406 includes a first opposing pair of sidewalls 428 and a second opposing pair of sidewalls 430 coupling the first opposing pair of sidewalls 428 to one another. The example apparatus housing 406 also includes an end wall 432 opposite the edge 426 forming a cavity. The end wall 432 defines an aperture 434 receiving a diaphragm 436 and a sensor window 438 coupled to the edges of the aperture 434 by the diaphragm 436. In some examples, the diaphragm 436 is configured to permit the sensor window 438 to vibrate in the aperture 434 relative to the apparatus housing 406. In the example shown, the opposing pairs of sidewalls 428 and 430 form a rectangular pyramid shape that results in the apparatus housing 406 and the cavity defined by the apparatus housing 406 to taper as the opposing pairs of sidewalls 428 and 430 extend from the edge 426 toward the end wall 432 of the apparatus housing 406, though such tapering need not be present, and any other housing shapes are contemplated (cylindrical, spheroidal, polygonal, etc.). In some examples, the sensor window 438 is configured to provide a path through which a signal is received by the sensor 404. The sensor window 438 may correspond to the sensor window 136 described herein. As noted herein, the sensor window 438 may be either an integral part of the associated sensor or a part separate from the associated sensor (e.g., as shown in FIGS. 4A-4C), and may include any material and/or medium through which an associated sensor 404 may receive a signal indicative of the environment, and thus, may include, but is not limited to, transparent materials, translucent materials, glass, polymers, polycarbonates, and/or combinations thereof.

In some examples, the system for mitigating an obstruction 116 may also include one or more of an active noise reduction actuator or a passive noise suppressor, each configured to reduce noise generated by operation of the vibratory actuator 126 (FIG. 1). For example, the active noise reduction actuator may include a magnetic coil or any other device configured to actively cancel noise generated by the vibratory actuator 126. In some examples, operation of the active noise reduction actuator may be controlled via the obstruction mitigation controller 120 or another part of the vehicle computing device 304 (FIG. 3).

In some examples, the passive noise suppressor may include a pressure relief valve, for example, the relief valve 440 shown in FIGS. 4A-4C, which is configured to passively release pressure inside the sensor housing 402 and/or the apparatus housing 406. In the example shown, the relief valve 440 is incorporated into one of the sidewalls of one of the opposing pairs of sidewalls 428 or 430. The apparatus 400 for mitigating an obstruction may include more than one relief valve, and the relief valve(s) may be incorporated into different portions of the apparatus housing 406 and/or the sensor housing 402. In some examples, the relief valve 440 may include a vent panel 442, for example, as shown.

As shown in FIGS. 4B and 4C, the example apparatus 400 for mitigating an obstruction includes a vibratory actuator 444 received in a housing 446 (FIG. 4C) and a heating element 448. In some examples, the vibratory actuator 444 may correspond to the vibratory actuator 126 described herein, and/or the heating element 448 may correspond to the heating element 128 described herein. In some examples, the vibratory actuator 444 may include one or more of a voice-coil, a motor, a linear actuator, a rotating magnet, an ultrasonic transducer, and/or device configured to cause the sensor window 438 to vibrate, for example, to remove and/or reduce the size of an obstruction on the sensor window 438, such as, for example, water droplets, ice, and/or snow on the sensor window 438.

As shown in FIG. 4C, in some examples, the apparatus housing 406 may define therein a sensor aperture 450 configured to receive a portion of the sensor 404, such as for example, a lens of an image capture device. In some examples, the sensor aperture 450 may provide a passage through which the sensor 404 receives signals indicative of the environment in which the sensor 404 is present.

In some examples, the sensor 404 may be configured to receive signals indicative of the environment at a sensor frequency. In some such examples, the obstruction mitigation controller 120 (FIG. 1) may be configured to initiate activation of the vibratory actuator 444 based at least in part on the sensor frequency. For example, if the sensor 404 is an image capture device, the image capture device may be configured to capture images at a frame rate (e.g., 30 Hz), which corresponds to a sensor frequency. Activation of the vibratory actuator 444 causes the sensor window 438 vibrate. The vibration may result in some reflections on the interior side of the sensor window 438 moving relative to the image capture device. Thus, the image capture device may capture the moving reflections, and the moving reflections, if not accounted for, might result in erroneous interpretations, for example, by the perception module 322 (FIG. 3). Thus, in some examples, the obstruction mitigation controller 120 (FIG. 1) may be configured to initiate activation of the vibratory actuator 444 based at least in part on the sensor frequency, so that the vibrations occur such that the reflections do not appear to move relative to the sensor 404 (e.g., the sensor window 438, though vibrating, is at the same position relative to the sensor at each image frame as the image capture device captures individual images by being in phase (or 90 degrees out of phase) with the sensor capture frequency (whether at the sensor capture frequency or a harmonic thereof) and/or vibrating at a frequency significantly higher than the sensor capture frequency). Thus, in some examples, the obstruction mitigation controller 120 is configured to initiate activation of the vibratory actuator 444 in a manner temporally aligned with the sensor frequency. In some examples, the sensor 404 includes an image capture device operable at a framerate frequency, and the obstruction mitigation controller 120 is configured to initiate activation of the vibratory actuator 444 based at least in part on the framerate frequency. In some examples, the obstruction mitigation controller 120 is configured to initiate activation of the vibratory actuator 444 based at least in part on multiples of the framerate frequency (i.e., a harmonic), and in some examples, temporally aligned with the multiples of the framerate frequency. For example, if the framerate frequency is 30 Hz, the obstruction mitigation controller 120 may be configured to initiate activation of the vibratory actuator 444 at 60 Hz, 90 Hz, 120 Hz, etc. As above, such actuation may be in-phase (i.e., the vibration actuation occurs during the sensor capture event) or out of phase (i.e., the vibration actuation occurs before or after the sensor capture event). In any such example, the phase offset and frequency may be selected so as to optimize (e.g., maximize) obstruction removal while optimizing (e.g., minimize) interference with sensor measurements.

In some examples, the obstruction detection system 120 may be configured to identify water droplets on the sensor window 438, and initiate activation of the vibratory actuator 444 at a frequency based at least in part on the size of the water droplets. For example, if the water droplets are relatively larger, the obstruction mitigation controller 120 may be configured to initiate activation of the vibratory actuator 444 at a relatively lower frequency. Alternatively, or additionally, if the water droplets are relatively smaller, the obstruction mitigation controller 120 may be configured to initiate activation of the vibratory actuator 444 at a relatively higher frequency. This may improve the effectiveness of mitigation of the obstruction, particularly when the obstruction involves moisture or fluid. In some examples, if the water droplets are relatively smaller, the obstruction mitigation controller 120 may be configured to initiate activation of the vibratory actuator 444 at a relatively lower frequency. Alternatively, or additionally, if the water droplets are relatively larger, the obstruction mitigation controller 120 may be configured to initiate activation of the vibratory actuator 444 at a relatively higher frequency.

In some examples, the obstruction mitigation controller 120 may be configured to initiate activation of the vibratory actuator 444 according to a pulsed waveform. For example, the pulsed waveform may include one or more of a sine wave, a saw wave, a square wave, etc. In some examples, the vibrations occur according to a waveform, such as, for example, one or more of a sine wave, a saw wave, a square wave, etc. In some examples, the obstruction mitigation controller 120 may be configured to initiate activation of the vibratory actuator 444 to initiate a surface wave associated with the sensor window 438 (e.g., a wave which propagates along the sensor window 438). In some such examples, the surface wave may include one or more of a lamb wave, a sine wave, a saw wave, a square wave, etc. In some examples, initiating activation of the vibratory actuator 444 in a pulsed manner (i.e., as opposed to a constant manner) may result in more effective mitigation of the obstruction.

Referring to the heating element 448, in some examples, the heating element 448 may include one or more of a metal heating element, a ceramic heating element, a thin-film heating element, an indium tin oxide layer, and/or any other device configured to remove and/or reduce the size of an obstruction on the sensor window 438, such as, for example, water droplets, fog, moisture, ice, and/or snow on the sensor window 438. In some examples, the heating element 448 may be electrically powered, and the power may be provided by sources associated with regeneration. For example, movement of the sensor window 438 generated by the vibratory actuator 444 may be converted into electrical energy and used to at least partially supply power to the heating element 442, for example, by electrical induction created by movement of a coil coupled to the vibratory actuator 444. Power for the heating element 448 may also be supplemented by, or supplied by, other sources. In those examples in which the heating element is transparent/translucent in the regime in which the sensor captures data (e.g., where ITO is used), such a heating element 448 may be integrally formed with the sensor window 438 (e.g., the sensor window 438 may be coated with ITO, such that the heating element 448 is formed on the sensor window 438).

As shown in FIGS. 4B and 4C, the apparatus 400 for mitigating an obstruction may include one or more sensors 452 configured to generate signals indicative of ambient conditions inside the apparatus housing 406 and/or inside the sensor housing 402. For example, as shown in FIGS. 4B and 4C, the apparatus 400 for mitigating an obstruction may include a sensor housing 454 including one or more sensors 452 configured to generate signals indicative of one or more of temperature, humidity, or pressure. In such examples, the obstruction detection system 118 (FIG. 1) may be configured to predict that an obstruction in the form of moisture may be present on the interior surface of the sensor window 438. In some examples, the obstruction detection system 118 may be configured to receive signals indicative of rain outside the apparatus 400 for mitigating an obstruction, and/or the temperature, humidity, and/or pressure outside the device (e.g., outside the autonomous vehicle), for example, via the interface cable 420. In such examples, the obstruction detection system 118 may be configured to predict that an obstruction in the form of moisture may be present on the exterior surface of the sensor window 438. In such instances, one or more of the vibratory actuator 444 or the heating element 448 may be activated to mitigate or remove the obstruction.

In some examples, the vibratory actuator 444 and the heating element 448 may be activated substantially simultaneously, in sequence, or in an overlapping manner. For example, in some circumstances, the vibratory actuator 444 and the heating element 448 may be activated substantially simultaneously (within technical tolerances). In some circumstances, the vibratory actuator 444 may be activated and deactivated, followed by activation of the heating element 448. In some circumstances, the heating element 448 may be activated and deactivated, followed by activation of the vibratory actuator 444. In some examples, the vibratory actuator 444 may continue operation for a duration after activation of the heating element 448, but may be deactivated prior to deactivation of the heating element 448. In some examples, the heating element 448 may continue operation for a duration after activation of the vibratory actuator 444, but may be deactivated prior to deactivation of the vibratory actuator 444.

In some examples, the heating element 448, when used in association with a vehicle, may be automatically activated upon start-up of the vehicle. The heating element 448 may continue to operate for a predetermined period of time, or may deactivate upon certain conditions, such as, for example, the temperature, humidity, and/or pressure inside (or outside) the sensor housing 402 and/or apparatus housing 406.

Figure 5:
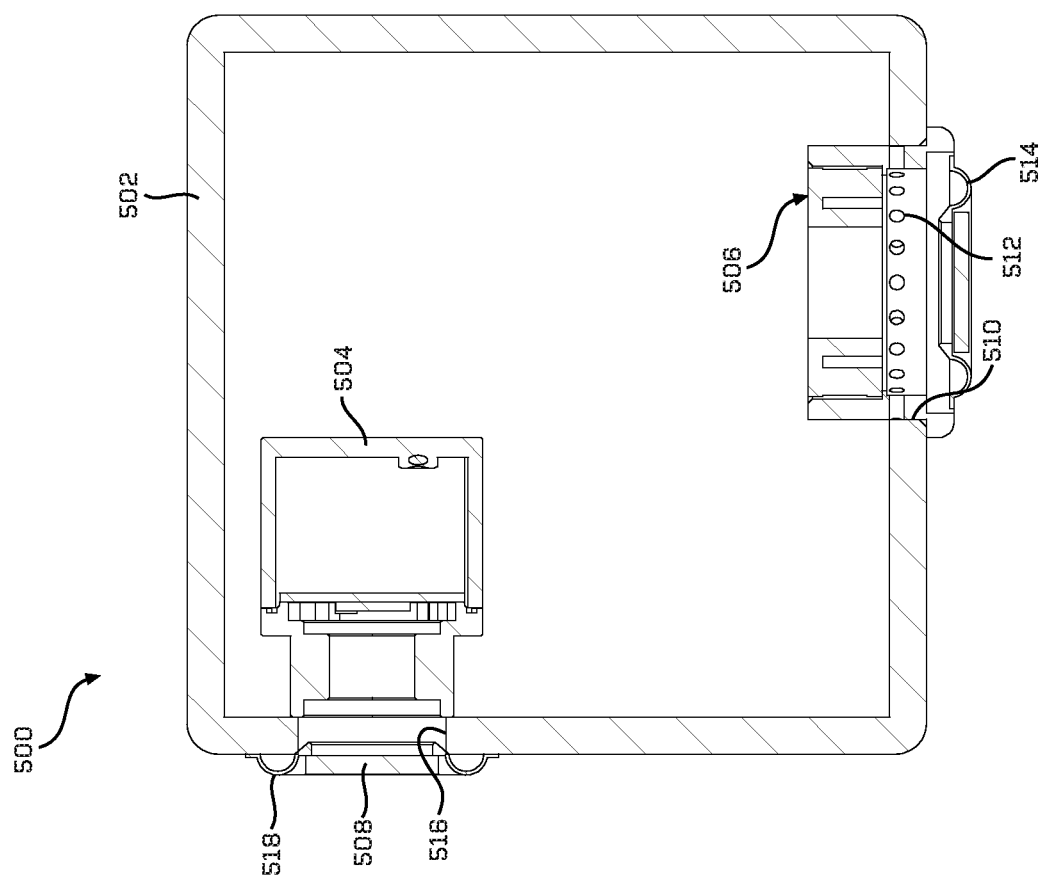
FIG. 5 is a partial side section view of an example device for detecting and mitigating an obstruction from a sensor.

In some examples, the apparatus 400 for mitigating an obstruction may include a relatively remotely located vibratory actuator. For example, as shown in FIG. 5, the example apparatus 500 for mitigating an obstruction includes an apparatus housing 502, a sensor 504, and a vibratory actuator 506 located remotely from the sensor 504 and a sensor window 508 associated with the sensor 504. In the example shown in FIG. 5, the apparatus housing 502 defines an actuator aperture 510, and the vibratory actuator 506 includes a voice-coil 512 (or any other actuator) coupled to the apparatus housing 502 via an actuator diaphragm 514 configured to facilitate movement of the voice-coil 512. In the example shown, the sensor window 508 is mounted in a sensor aperture 516 in the apparatus housing 502, which may be sealed, such that changes in pressure in the apparatus housing 502 created by operation of the voice-coil 512 cause the sensor window 508, mounted via a diaphragm 518, to vibrate and thereby mitigate an obstruction, such as, for example, moisture. Although shown as a cubical structure in FIG. 5, the apparatus housing 502 may take other forms. In some examples, the example apparatus 500 shown in FIG. 5 may also include a heating element, for example, as described with respect to FIGS. 4A-4C.

Figure 6:
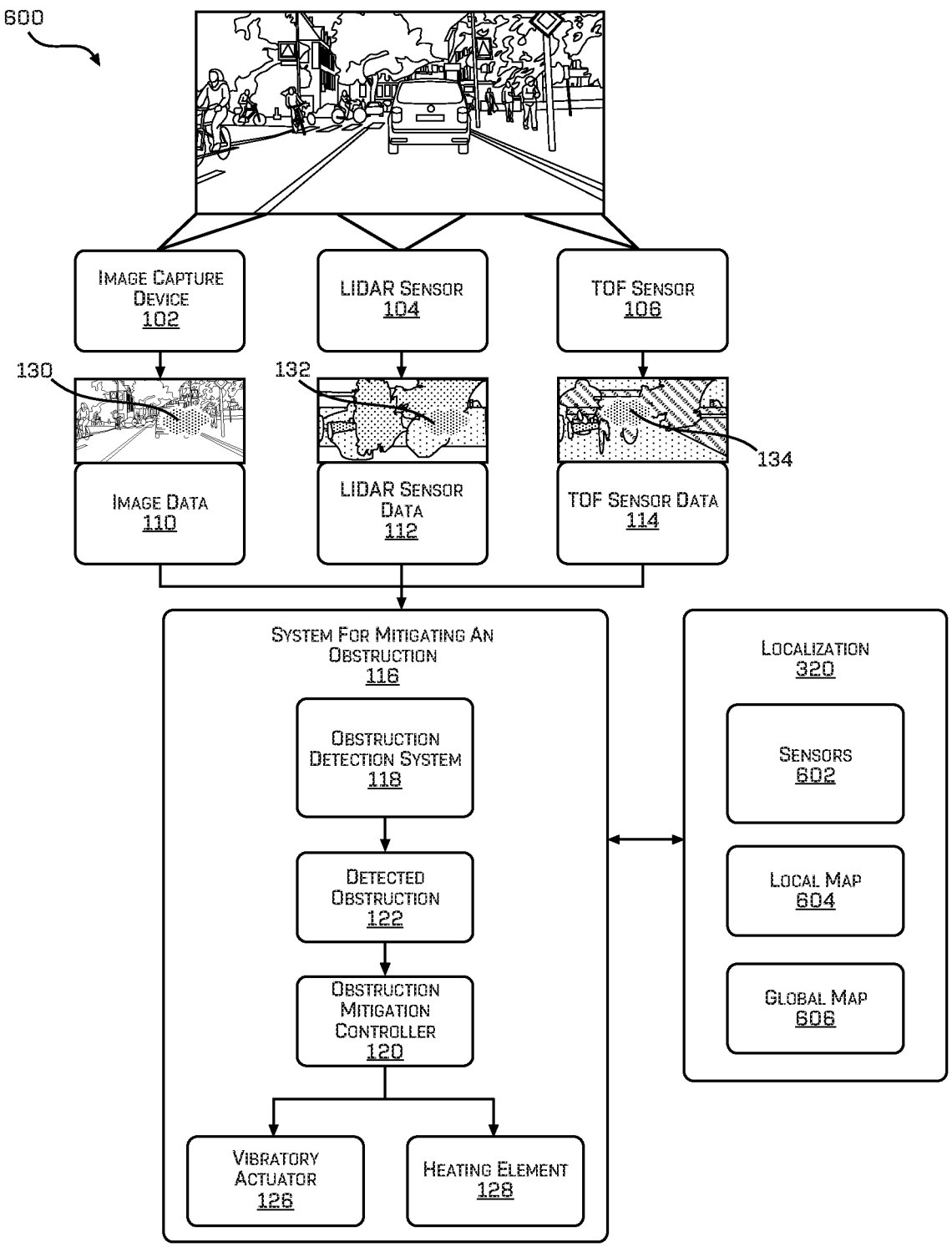
FIG. 6 is a pictorial flow diagram of an example process for detecting and mitigating an obstruction on a surface of a sensor including use of an example localization module for detecting the obstruction.

FIG. 6 is a pictorial flow diagram of an example process 600 for detecting and removing an obstruction from a surface of a sensor using an example localization module. Similar to FIG. 1, sensors, which may include an image capture device 102, a LIDAR sensor 104, and/or another TOF sensor 106, may be coupled to a vehicle travelling through the environment 108. The image capture device 102, LIDAR sensor 104, and TOF sensor 106 capture image data 110, LIDAR sensor data 112, and TOF sensor data 114, respectively, representative of the environment 108, and may communicate the data to the system for mitigating an obstruction 116, which may be configured to detect an obstruction partially or completely obstructing the field of view of one or more of the image capture device 102, the LIDAR sensor 104, and/or the TOF sensor 106. In the example shown, the system for mitigating an obstruction 116 may include an obstruction detection system 118 configured to receive one or more signals from the image capture device 102, the LIDAR sensor 104, or the TOF sensor 106 and determine, based at least in part on the one or more signals, the presence of an obstruction on a surface of one or more of the image capture device 102, the LIDAR sensor 104, or the TOF sensor 106.

For example, as shown in FIG. 6, each of the image capture device 102, the LIDAR sensor 104, and the TOF sensor 106 has a respective obstruction 130, 132, and 134, as schematically depicted in the image data 110, LIDAR sensor data 112, and the TOF sensor data 114. The image data 110, the LIDAR sensor data 112, and the TOF sensor data 114 are communicated to the example system for mitigating an obstruction 116. In the example shown in FIG. 6, the system for mitigating an obstruction 116 may receive one or more signals from the localization component 320 (FIG. 3). In some examples, the localization component 320 may include sensors 602 configured to generate signals indicative of one or more of the position or orientation of the vehicle, which may include image capture devices (e.g., image capture device 102), LIDAR sensors (e.g., LIDAR sensor 104), and other sensors (e.g., TOF sensor 106) configured to supply sensor data for determining one or more of the position or orientation of the vehicle. In some examples, the sensors 602 may also include one or more accelerometers, one or more gyroscopes, one or more magnetometers, one or more inertial measurement units (IMUs), a global positioning system, etc. In some examples, the localization component 320 may also receive one or more signals indicative of a local map 604 and/or one or more signals indicative of a global map 606 to assist the localization component 320 with determining the pose of the vehicle.

In the example shown in FIG. 6, determining the presence of the obstruction on the surface of one or more of the sensors may include comparing map data derived from the one or more signals received from one or more of the image capture device 102, the LIDAR sensor 104, and the TOF sensor 106 to map data corresponding to the pose of the vehicle. For example, based on the one or more signals, map data may be determined by a localization component 320, and the determined map data may be compared to map data corresponding to the location of the vehicle. For example, as shown in FIG. 6, each of the image capture device 102, the LIDAR sensor 104, and the TOF sensor 106 have respective obstructions 130, 132, and 134 on the surface thereof. In some examples, the obstruction detection system 118 may be configured to compare the map data derived from the one or more signals received from one or more of the image capture device 102, the LIDAR sensor 104, or the TOF sensor 106 with map data corresponding to the location of the vehicle Based at least in part on the comparison, the obstruction detection system 118 may be configured to determine whether the sensors are detecting objects that are represented by the one or more localization signals received from the localization component 320. Based at least in part on any differences (e.g., differences greater than a threshold magnitude), the obstruction detection system 118 may determine the presence of the obstruction on the surface of the affected sensor, for example, which is preventing the sensor from sensing an object represented by the one or more localization signals. In the example shown, each of the image capture device 102, the LIDAR sensor 104, and the TOF sensor 106 have respective obstructions 130, 132, and 134, and a comparison of the image data 110, the LIDAR sensor data 112, and the TOF sensor data 114 with the localization signals may result in identifying the differences between the objects and/or environment detected by the image capture device 102, the LIDAR sensor 104, and the TOF sensor 106, and the objects represented by the localization signals. As a non-limiting example, the localization data may include information about the environment surrounding the vehicle, such as, but not limited to, a corresponding mesh. Such a mesh may be used to calculate expected depth values from the LIDAR sensor to the mesh which, in turn, may be compared to the measured values from the LIDAR sensor 104. Other techniques described herein may be used to confirm or discount that the obstruction determination is accurate.

Figure 7:
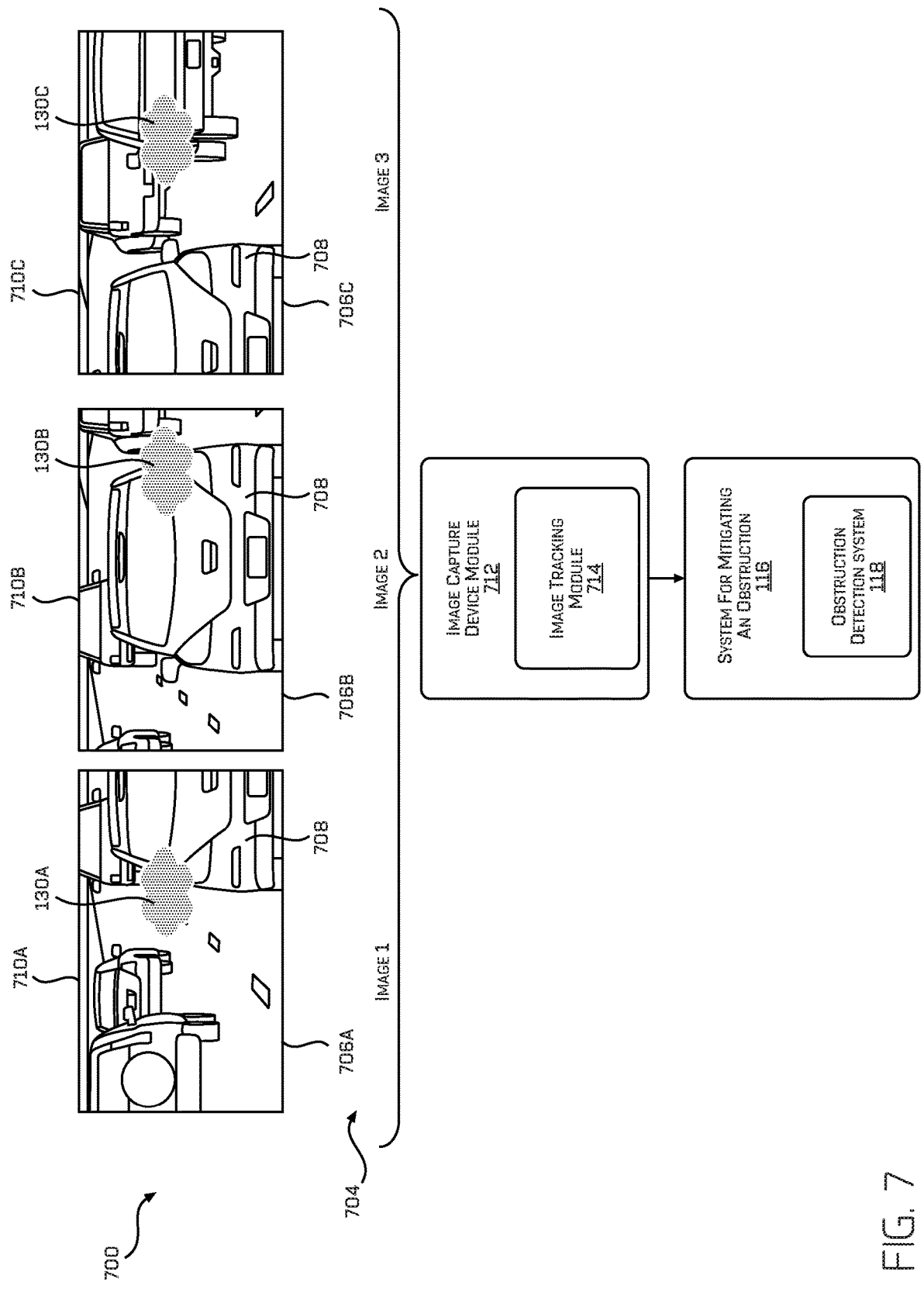
FIG. 7 is a pictorial flow diagram of an example process for detecting an obstruction on a surface of a sensor using an example image tracking module.

FIG. 7 is a pictorial flow diagram of an example process 700 for detecting and removing an obstruction from a surface of a sensor using an example image tracking module 714. In the example process 700 shown in FIG. 7, the sensor may include an image capture device, and determining the presence of the obstruction 130 on the surface of the sensor may include receiving signals from the image capture device corresponding a sequence of images indicative of features present in the environment, and tracking features through the sequence of images (e.g., using SIFT, SURF, ORB, A-KAZE, HOG, etc.). The image capture device may include, for example, one or more cameras (e.g., RGB-cameras, monochrome cameras, intensity (grey scale) cameras, infrared cameras, ultraviolet cameras, depth cameras, stereo cameras, and the like). In some such examples, determining the presence of the obstruction 130 may include identifying the obstruction by identifying a feature in the sequence of images that fails to move in a manner consistent with other features.

In the example shown in FIG. 7, a sequence 704 of images 706A-706C corresponding to Images 1-3 is schematically depicted. As seen in the images 706A-706C, as, for example, a vehicle, having an image capture device mounted thereon changes lanes, the vehicle 708 closest to the image capture device and the other vehicles in the images 706A-706C move to the left relative to the fields of view 710A-710C, with vehicles and lane divider lines all moving through the images 706A-706C progressively. In contrast, the obstruction 130A-130C remains at the same location in each of the images 706A-706C of the sequence 704. Thus, if a relatively large portion of the features captured in images of an image sequence moves through and out of the image sequence in a consistent manner (e.g., because the sensor is moving through the environment), and another feature does not move relative to the sequence of images, it may be an indication that the non-moving feature is an obstruction on the sensor rather than a feature in the environment. In some examples, such feature calculation and relevant feature motion determinations may be associated with a speed of the vehicle as determined using any number of sensors, and in some examples, may be performed by an image capture device module 712, which may include an image tracking module 714. Additionally, or alternatively, regions of an image consistently having an optical flow of zero may be associated with an obstruction. In some examples, such a region (any of regions 130A-130C) may be determined based on a lack of features (e.g., where blurring occurs from moisture, occlusion from debris, etc.) and/or a lack of edges or lines (as may be determined based on, for example, Harris corners, Laplacian kernels, etc.). In some examples, this detection of the obstruction 130 may be confirmed or discounted, for example, according to other methods described herein. In some examples, tracking may be performed by tracking a feature between two or more different sensors, such that a lost feature may indicate an obstruction.

Figure 8:
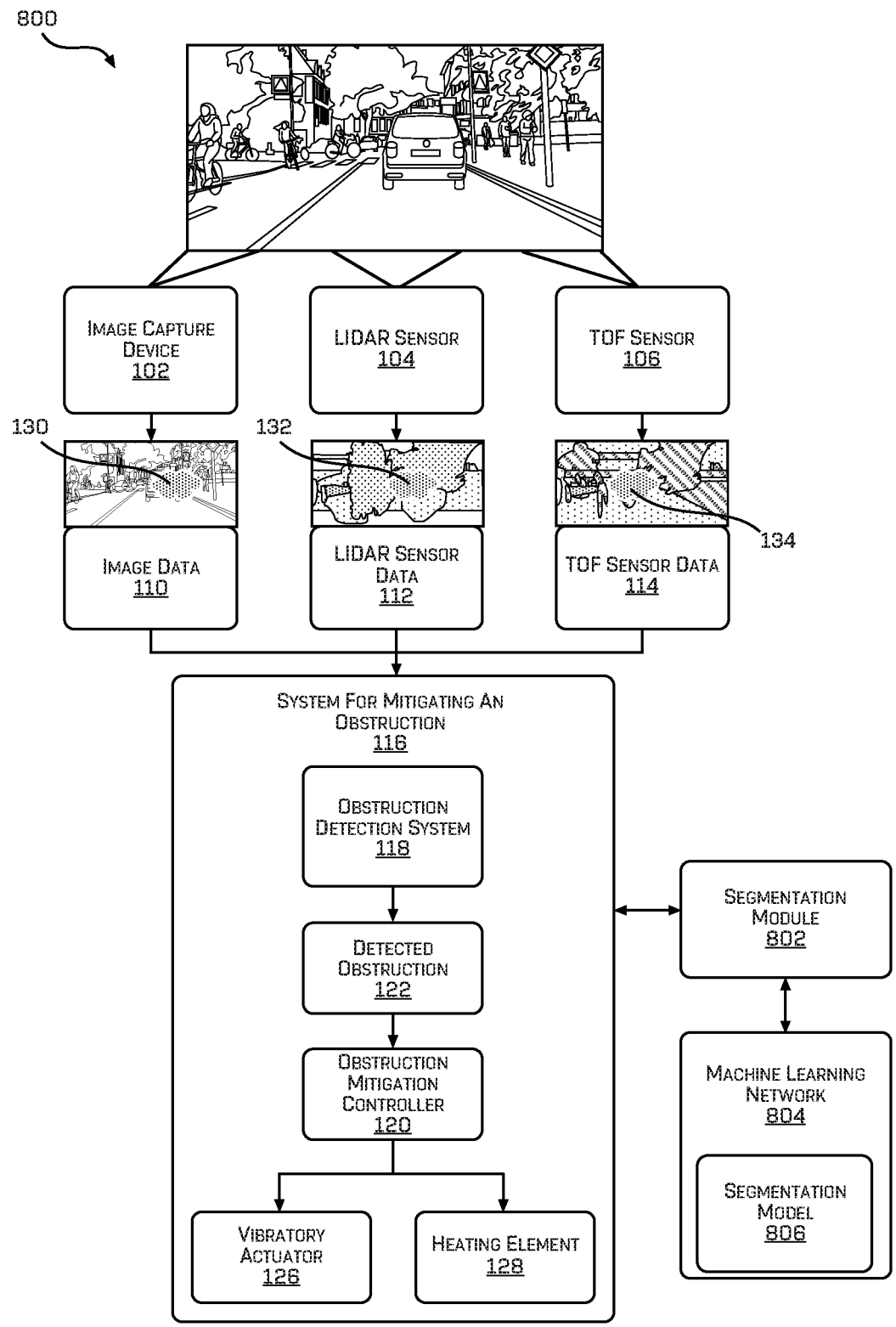
FIG. 8 is an example pictorial flow diagram of an example process for detecting and mitigating an obstruction on a surface of a sensor using an example segmentation module and machine learning network for detecting the obstruction.

FIG. 8 is a pictorial flow diagram of an example process 800 for detecting and removing an obstruction from a surface of a sensor using an example segmentation module 802 and machine learning network 804 (e.g., a convolutional neural network (CNN)). For example, the image capture device 102, the LIDAR sensor 104, and/or the TOF sensor 106 may communicate one or more signals indicative of a scene in the environment to the system for mitigating an obstruction 116, and the obstruction detection system 118 may communicate the one or more signals to the segmentation module 802, so that the data may be segmented using the machine learning network 804 (e.g., the image data 110 may be segmented). The same, or similar, algorithms may be used to segment any one or more of the other sensor modalities. In some examples, the machine learning network 804 may execute a segmentation model 806 trained to segment the data and/or classify objects in the data. In some examples, based at least in part on the segmentation, the machine learning network 804 may be configured to determine the presence of an obstruction on the surface of one or more of the image capture device 102, the LIDAR sensor 104, or the TOF sensor 106, for example, by identifying at least one segment in the scene that is stationary relative to the sensor in a manner inconsistent with other segments in the scene (e.g., the at least one segment is stationary relative to the first sensor while one or more other segments in the scene move relative to the first sensor). For example, the machine learning network 804 may segment and/or categorize all objects detected in a scene, and the obstruction may be stationary in the scene even though everything else in the scene is in motion relative to the sensors and/or relative to the vehicle. This may be an indication that the stationary object is an obstruction rather than something in the environment. In some examples, this form of detection of an obstruction may be confirmed or discounted, for example, according to other methods described herein. Though described in the context of a machine learned model for segmentation herein, such a machine learned model may be trained to detect obstructions directly. As a non-limiting example, a machine learned model may be trained to detect the presence of moisture (rain, ice, fog, etc.), debris, etc., in any sensor data directly (e.g., by passing raw sensor data directly into the model and receiving, from the model, an indication of obstruction).

The machine learning network 804 may include any type of machine learning network described herein. For example, the machine learning network 804 may be a CNN. In some examples, the machine learning network 804 may include more than one machine learning network. As explained herein, more than one type of machine learning may be used to provide respective results for each of the types of machine learning used. In some examples, a confidence score may be associated with each of the results, and the result relied on may be based at least in part on the confidence score associated with the result. For example, the result associated with the highest confidence score may be selected over other results, or the results may be combined based on the confidence scores, for example, based on statistical methods, such as weighted averages, etc.

To produce a valid output, a machine learning network, such as, for example, a CNN, must first learn a set of parameters, or be "trained." Training is accomplished by inputting a dataset into the network, the dataset being associated with expected output values. These expected output values may generally be referred to as "ground truth." For example, a ground truth may include an identification of specific objects in an image, as well as a semantic classification or label associated with the object (e.g., identifying and labeling an object as a car or a building). The accuracy of a network may be based on the amount and/or accuracy of data provided in the training dataset. As a result, an appropriate dataset to train a network to output segmented sensor data would include sensor data having known, or previously determined, segments. In some examples, training datasets may include one or more segmented images representative of real-world scenes correlated with one or more sensor datasets representative of real-world scenes, which may be annotated by hand or via one or more algorithms configured to segment, detect, classify, and/or label objects in the sensor datasets. In other examples (e.g., those examples where the machine learned model is trained to detect the obstruction directly), ground truth data may include data having known obstructions (e.g., fog, ice, rain, etc.). In such examples, the machine learned model may further be trained to output an indication of whether to engage the vibratory actuator and/or the heating element based on the ground truth input (e.g., engage the heater only with fog, the heater and vibratory actuator with cold rain, etc.). In some examples, a training dataset may include synthetic (e.g., computer generated) data that includes annotated objects or that has been annotated by a computer algorithm. Training can be performed using offline and/or online data.

Loss functions may be used to adjust internal parameters of the network during training. The loss functions are functions of the expected output (or ground truth) values for the dataset and values output by the network. Information contained in loss functions may be sent through the network as back propagations to adjust internal parameters, thereby tuning the network to provide valid outputs. All else being equal, the more data used to train a network, the more reliable the network may be (e.g., in providing accurate segmentations and/or classifications). Some exemplary loss functions include, but are not limited to, support vector machine (SVM) loss, hinge loss, etc.

In any of the above referenced examples, one sensor modality may inform any other sensor modality. As a non-limiting example, LIDAR sensor data 112 may indicate an object (whether static or dynamic) in the environment proximate to the vehicle as may be determined based on, for example, LIDAR feature tracking, LIDAR segmentation, LIDAR classification, and the like. In such examples, objects determined in the LIDAR sensor data 112 may be used to determine an expected sensor return in the remaining sensor modalities (e.g., in other LIDAR sensors, in image data 110, or TOF sensor data 114). Discrepancies between expected object detections and measurements of the data may indicate an obstruction. Based on the calculated difference (or discrepancy), a type of obstruction may also be determined (e.g., moisture may be associated with different features and/or a blur, a lack of features may be associated with a full obstruction, and the like). It is further contemplated that sensor data from any first subset (including the full set) of sensor data may be compared to any second subset of sensor data to determine the existence of an obstruction. In some examples, this may be accomplished using one or more of the techniques described in U.S. Non-provisional patent application Ser. No. 15/944,240, filed Apr. 3, 2018, the disclosure of which is incorporated herein by reference.

Figure 9:
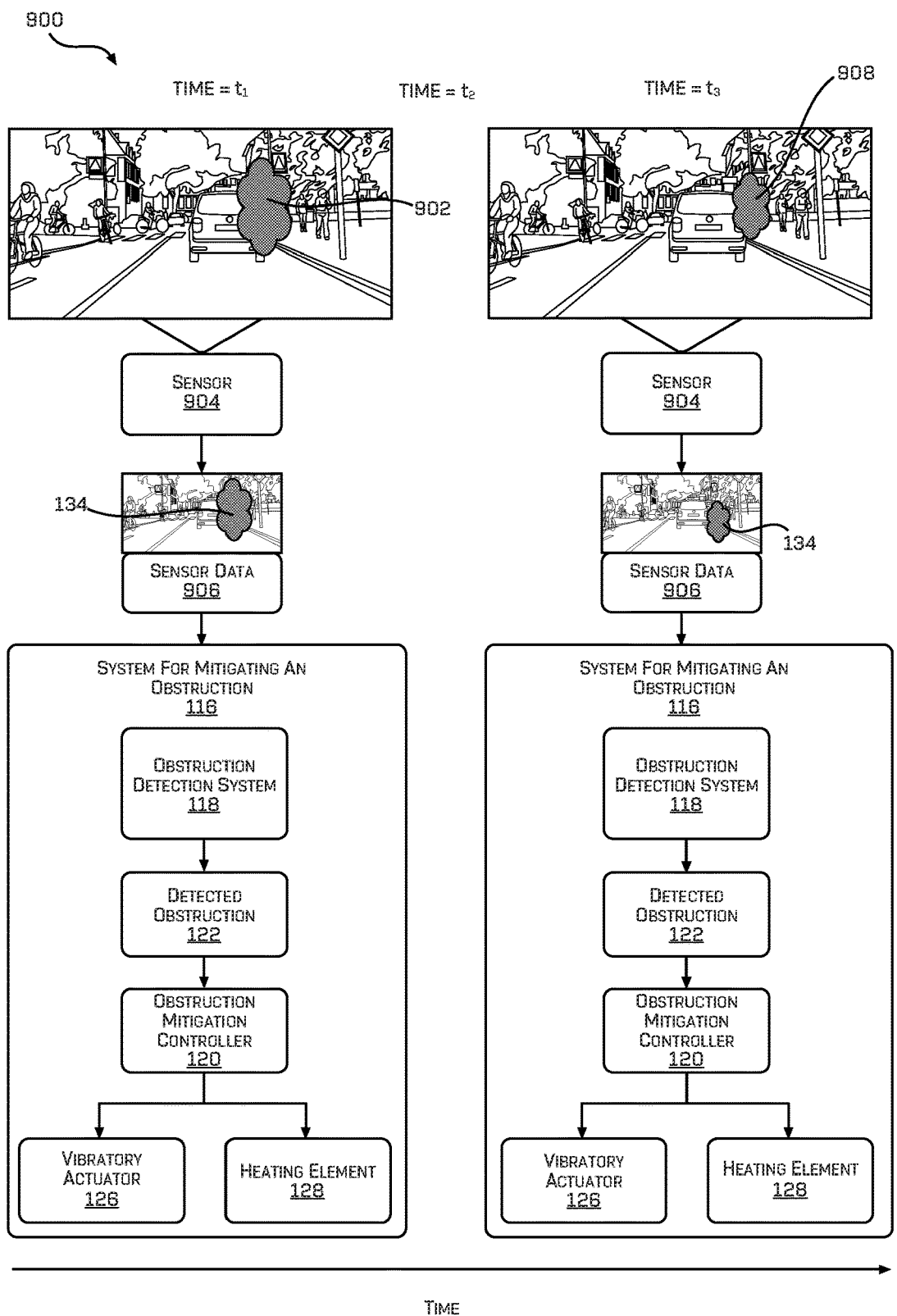
FIG. 9 is a pictorial flow diagram of an example process for detecting and mitigating an obstruction on a surface of a sensor using an example vibratory actuator and heating element to mitigate the obstruction.

FIG. 9 is a pictorial flow diagram of an example process 900 for detecting and removing an obstruction 902 from a surface of a sensor 904 (e.g., an image capture device) generating sensor data 906 using an example system for mitigating an obstruction 116 including a vibratory actuator 126 and a heating element 128. In the schematic depiction of FIG. 9, time $t_1$ through time $t_3$ is shown in sequence from left-to-right. In this example, the obstruction mitigation controller 120 of the system for mitigating an obstruction 116 at $t_1$ communicates with one or more of the vibratory actuator 126 or the heating element 128, which at $t_2$ causes one or more of the vibratory actuator 126 or the heating element 128 to actuate, which is configured to at least partially remove obstructions from an affected sensor, to actuate. At $t_3$, the obstruction detection system 118 evaluates whether activation of one or more of the vibratory actuator 126 or the heating element 128 has affected the data obtained from the sensor 904, which might be an indication that there was an obstruction on the surface of the sensor 904 that was at least partially removed by the vibratory actuator 126 and/or heating element 128. For example, as schematically depicted at time $t_3$, relative to the obstruction 902 at $t_1$ shown, the obstruction 908 at time $t_3$ has become relatively smaller. This is an indication that the obstruction 902 was an obstruction on the sensor 904 rather than a detected object in the environment. In some examples, if at $t_3$ the obstruction 908 at least partially remains on the sensor 904, the system for mitigating an obstruction 116 may take further action to mitigate the effects of the obstruction 908 and/or remove more of the obstruction 908, for example, as described herein. In some examples, this form of detection of an obstruction may be confirmed or discounted, for example, according to other methods described herein.

Figure 10:
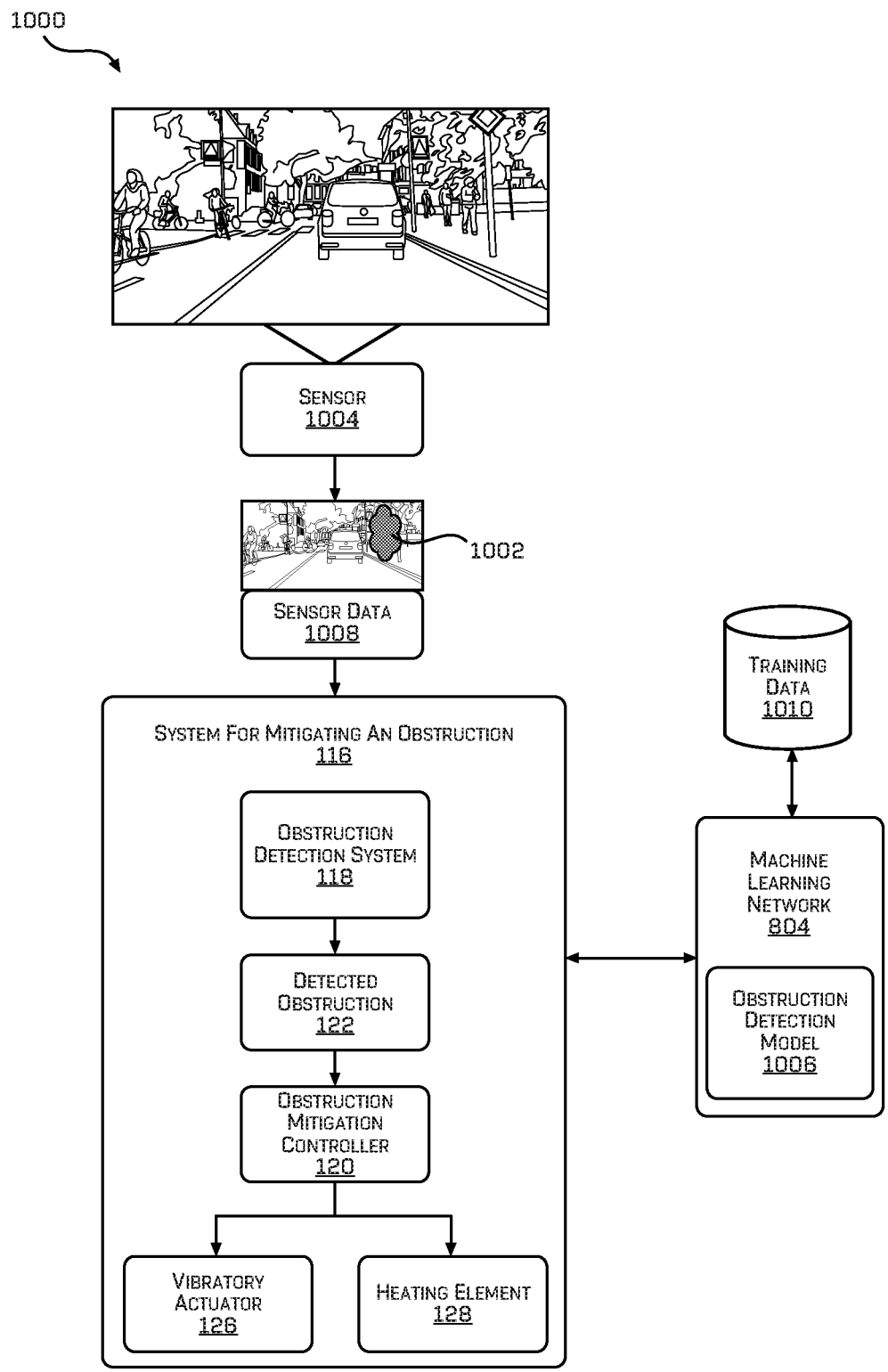
FIG. 10 is a pictorial flow diagram of an example process for detecting and mitigating an obstruction on a surface of a sensor using an example machine learning network executing an obstruction detection model trained to detect obstructions.

FIG. 10 is a pictorial flow diagram of an example process 1000 for detecting and removing an obstruction 1002 from a surface of a sensor 1004 using an example machine learning network 804 executing an obstruction detection model 1006 trained to detect obstructions. For example, the system for mitigating an obstruction 116 may communicate sensor data 1008 to the machine learning network 804, and the obstruction detection model 1006 may, in some examples, be trained to identify an obstruction 1002 on the surface of the sensor 1004. In some such examples, the machine learning network 804 may be trained to distinguish obstructions from objects in the environment, for example, via training data 1010 correlating one or more sensor signals with obstructions. In identifying obstructions, confidence levels may be associated with the identification of an obstruction, and the system for obstruction detection 116, in some examples, may be configured to initiate the response when a confidence level associated with the identification meets or exceeds a threshold confidence level. For example, a response such as one or more of those described herein may be used to mitigate or at least partially remove the obstruction 1002 from the sensor 1004. In some examples, this detection of an obstruction may be confirmed or discounted, for example, according to other methods described herein. Further, in some examples, such a detection model may be trained to output a suggested correction action. As a non-limiting example, such a model may be trained to detect moisture and output an action to vibrate and/or heat the sensor window and mitigate an obstruction caused by the moisture.

Figure 11:
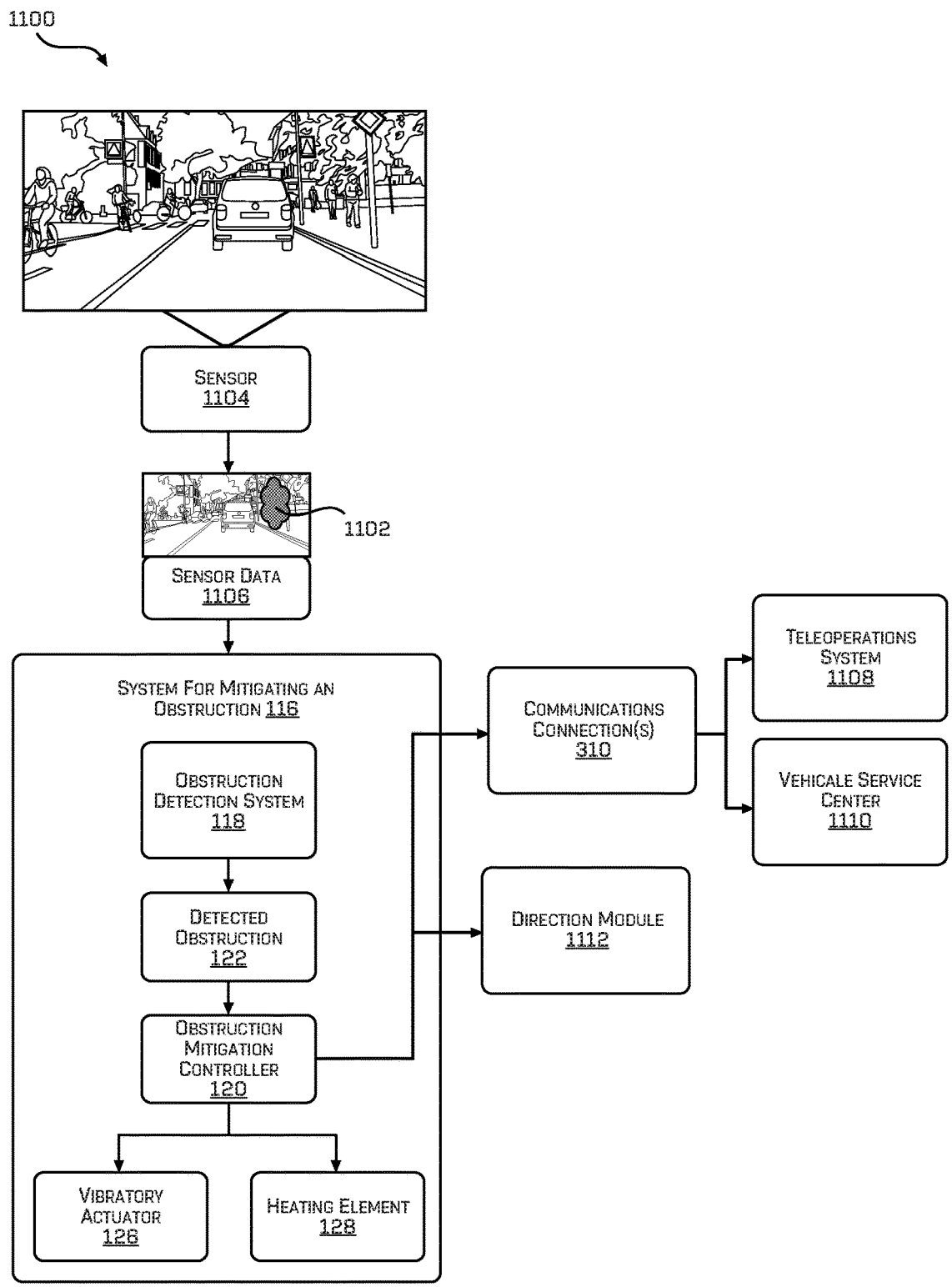
FIG. 11 is a pictorial flow diagram of an example process for detecting and mitigating an obstruction from a surface of a sensor including example actions responsive to detecting an obstruction.

FIG. 11 is a pictorial flow diagram of an example process 1100 for detecting and removing an obstruction 1102 from a surface of a sensor 1104 generating sensor data 1106 including example actions responsive to detecting the obstruction 1102. For example, once the obstruction detection system 118 has determined the presence of the obstruction 1102, for example, as described herein, the obstruction detection system 118 communicates with the obstruction mitigation controller 120, which in turn, may initiate a response to mitigate the effects of the obstruction 1102 and/or at least partially remove the obstruction from the sensor 1104.

In some examples, initiating the response may include either ignoring the one or more signals from the sensor 1104, for example, until the effects of the obstruction 1102 have been mitigated or the obstruction 1102 has been at least partially removed. For example, the obstruction mitigation controller 120 may communicate with a vehicle control module associated with the vehicle, so that the vehicle may respond accordingly. In some examples, portions of data from the sensor 1104 associated with the obstruction 1102 may be ignored. For example, if the obstruction detection system 118 determines that the obstruction 1102 is present on the sensor 1104, the one or more signals may be ignored by the system receiving the one or more signals, such as, for example, a vehicle control module. In some examples, only portions of the data determined to be affected by the obstruction 1102 may be ignored, while other portions of the data may be used by other systems associated with the vehicle, such as the vehicle control module.

In some examples, initiating the response may include at least partially removing the obstruction by activating an actuator configured to shrink or remove the obstruction. For example, as shown in FIG. 11, the obstruction mitigation controller 120 may communicate with the vibratory actuator 126 and/or the heating element 128 to mitigate the obstruction 1102.

In some examples, initiating the response may include one or more of initiating communication, for example, via the communication connection(s) 310 (FIG. 3), with a teleoperations system 1108 configured to assist with operation of the vehicle, or initiating notification of a vehicle service center 1110 regarding the obstruction 1102. For example, the vehicle may be configured to operate according to an assisted mode, wherein the teleoperations system 1108, which may be located remotely from the vehicle, may receive one or more signals from the vehicle (e.g., via the communication connection(s) 310 and/or a related communications network) relating to its operation. For example, the teleoperations system 1108 may be configured to detect the obstruction 1102 based on the one or more signals received from the vehicle, for example, via a teleoperator and/or one or more of the methods described herein. The teleoperations system 1108 may be configured to send one or more signals to the vehicle causing the vehicle to initiate a response to mitigate or at least partially remove the obstruction, for example, as described herein. In some examples, the vehicle may be configured to notify the service center 1110 of the obstruction 1102. In some such examples, the vehicle may also travel to the service center 1110, where the obstruction 1102 may be mitigated or at least partially removed.

In some examples, initiating the response may include reversing a direction of travel of the vehicle, for example, by communication with a direction module 1112, which may be part of the drive module(s) 314 (FIG. 3). In some examples, the vehicle may be a bi-directional vehicle configured to operate generally with equal performance in either a first direction or a second opposite direction, for example, as described herein. In such examples, the vehicle may have at least similar sensors at both ends of the vehicle, and the direction module 1112 may be configured to cause the vehicle to operate in the opposite direction of travel if the obstruction detection system 118 determines that an obstruction 1102 is affecting operation of one or more of its sensors 1104 facing toward, or having a field of view facing, the first direction of travel. This may serve to mitigate the effects of the obstruction 1102 until the obstruction 1102 can be reduced in size or removed from the sensor 1104.

In various implementations, the parameter values and other data illustrated herein may be included in one or more data stores, and may be combined with other information not described or may be partitioned differently into more, fewer, or different data structures. In some implementations, data stores may be physically located in one memory or may be distributed among two or more memories.

Figure 12:
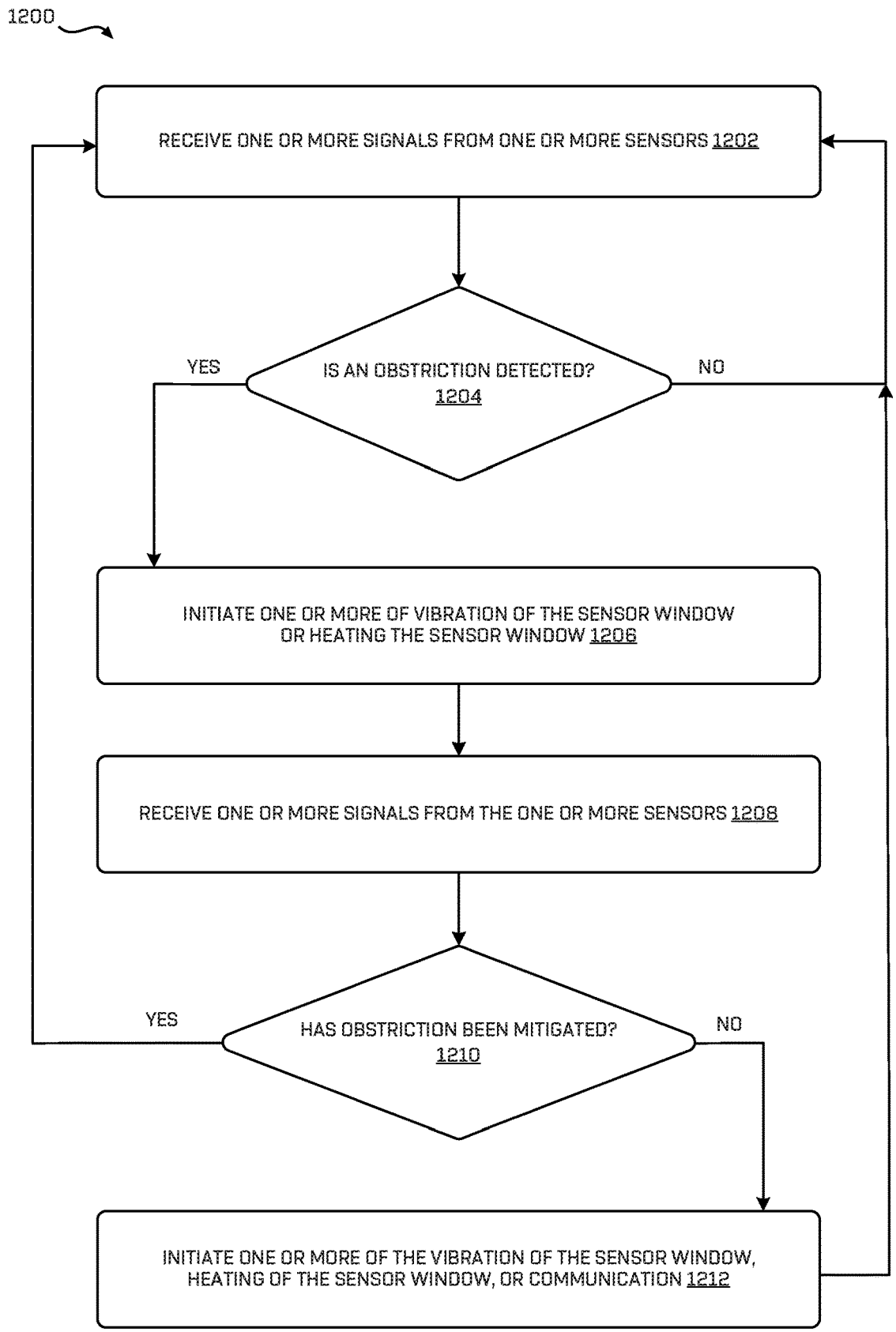
FIG. 12 is a flow diagram of an example process for determining a presence of an obstruction on a surface of a sensor and initiating a response to mitigate the obstruction.

FIG. 12 is a flow diagram of an example process illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 12 is a flow diagram of an example process 1200 for determining a presence of an obstruction on a surface of a sensor (e.g., on a sensor window associated with a sensor) and initiating a response to mitigate effects of the obstruction or at least partially remove the obstruction.

At 1202, the example process 1200 may include receiving one or more signals from one or more sensors configured to generate signals indicative of one or more of an object detectible in an environment in which one or more of the sensors is present or an ambient condition associated with one or more of the sensors. The sensors may include any of the sensor types discussed herein, and the objects may include any objects that may be present in the environment. In some examples, the signals may be received by an obstruction detection system of a system for mitigating an obstruction, for example, as described herein.

At 1204, the example process 1200 may also include determining whether an obstruction is detected. In some examples, this may include detecting, based at least in part on the one or more signals, an obstruction on a sensor window through which a first sensor of the one or more sensors receives a signal indicative of the environment. In some examples, an obstruction detection system such those described herein may be configured to detect an obstruction based on signals received from the one or more sensors according to one or more of the processes described herein.

In some examples, the one or more signals may include a first signal from the first sensor, and detecting the obstruction may include inputting the first signal into a neural network configured to identify the obstruction based at least in part on the first signal from the first sensor. For example, detecting the obstruction may include classifying the obstruction by comparing the first signal to a localization signal of a localization system configured to determine one or more of a position or orientation of the first sensor based at least in part on a signal received from one or more of a global positioning system, an inertial measurement unit, a LIDAR sensor, or an image capture device.

In some examples, classifying the obstruction may include receiving a second signal representative of the environment in which the first sensor is present, and comparing the second signal to the first signal to determine a difference between objects represented by the first signal and objects represented by the second signal. In such examples, the first signal and the second signal are generated by one of (1) the first sensor at different times (e.g., comparing sensor data of a present time with sensor data of a previous time), (2) the first sensor and a second sensor, respectively, the first and second sensors being a common type of sensor, or (3) the first sensor and a second sensor, respectively, the first sensor being a first type of sensor and the second sensor being a second type of sensor different than the first type of sensor.

In some examples of the process 1200, the first sensor may include an image capture device, and receiving one or more signals may include receiving signals from the image capture device corresponding to a sequence of images, an image of the sequence of images including multiple image features. In such examples, detecting an obstruction may include tracking the multiple image features through the sequence of images, and identifying, using computer vision, the obstruction by identifying a feature in the sequence of images that fails to move in a manner consistent with one or more other features of the multiple image features, for example, as described herein.

If at 1204, no obstruction is detected, the example process 1200 may return to 1202. If, on the other hand, an obstruction is detected at 1204, the example process 1200 may include, at 1206, initiating, based at least in part on the detection of the obstruction, one or more of vibration of the sensor window to mitigate the obstruction or heating of the sensor window to mitigate the obstruction. For example, a system for mitigating an obstruction may include an obstruction mitigation controller configured to receive a signal indicative of a detected obstruction from the obstruction detection system, and initiate activation of a vibratory actuator and/or a heating element to mitigate the effects of the detected obstruction, for example, as described herein.

In some examples, the first sensor may be configured to receive the signal indicative of the environment at a sensor frequency, and the process 1200 further includes initiating the vibration based at least in part on the sensor frequency, for example, as described herein. For example, the process 1200 may include initiating the vibration in a manner temporally aligned with the sensor frequency, for example, as described herein. In some examples, the first sensor may include an image capture device operable at a framerate frequency, and the process 1200 may include initiating the vibration based at least in part on the framerate frequency, for example, as described herein.

In some examples of the process 1200, detecting an obstruction may include inputting the first signal into a machine learning network trained to identify an obstruction on the sensor window, and initiating the one or more of vibration or heating of the sensor window based at least in part on a confidence level associated with the identification of the obstruction meeting or exceeding a threshold confidence level.

In some examples, the first sensor may be disposed on an autonomous vehicle, and the process 1200 may also include one or more of (1) initiating communication with a teleoperations system configured to assist with operation of the vehicle, (2) initiating notification of a vehicle service center regarding the obstruction, or (3) reversing a direction of travel of the vehicle, for example, as described herein.

In some examples of the process 1200, detecting an obstruction may include identifying droplets on the sensor window, and the process 1200 may include initiating the vibration at a frequency based at least in part on a size of the droplets, for example, as described herein.

In some examples of the process 1200, initiating the vibration may include initiating the vibration in a pulsing manner. For example, initiating the vibration may include initiating the vibration according to a pulsed waveform, and the pulsed waveform may include one or more of a sine wave, a saw wave, a square wave, etc. In some examples of the process 1200, initiating the vibration may include initiating a surface wave associated with the sensor window, for example, one or more of a lamb wave, a sine wave, a saw wave, a square wave, etc.

At 1208, the process 1200 in some examples may include receiving one or more signals from one or more sensors configured to generate signals indicative of an environment in which one or more of the sensors is present or an ambient condition associated with one or more of the sensors, for example, in a manner similar to 1202.

At 1210, in some examples of the process 1200 may include determining whether the obstruction has been mitigated. This may include comparing the obstruction detected at 1204 to any obstruction detected at 1210, and determining whether the obstruction has been mitigated (e.g., the obstruction has been reduced in size and/or effect with respect to affected sensor's ability to sense objects in the environment, or has been removed). If the obstruction has been mitigated, the process 1200 may return to 1202. If, on the other hand, the obstruction has not been mitigated, at 1212, the process 1200 may initiate one or more of vibration of the sensor window, heating of the sensor window, or communication with one or more of a vehicle direction module, a teleoperations system, or a vehicle service center, for example, such that one or more corrective actions described previously herein may be performed.

The systems, components, and methods described herein may be implemented using any combination of software or hardware elements. The systems, components, and methods described herein may be implemented using one or more virtual machines operating alone or in combination with one other. Any applicable virtualization solution may be used for encapsulating a physical computing machine platform into a virtual machine that is executed under the control of virtualization software running on a hardware computing platform or host. The virtual machine may have both virtual system hardware and guest operating system software.

The systems and methods described herein may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication, such as a communication network. Examples of communication networks include, for example, a LAN, a WAN, and the computers and networks that form the Internet.

One or more embodiments of the present disclosure may be practiced with other computer system configurations, including hand-held devices, microprocessor systems, microprocessor-based or programmable consumer electronics, minicomputers, mainframe computers, etc. The systems and methods described herein may also be practiced in distributed computing environments where tasks are performed by remote processing devices that are linked through a network.

It should be appreciated that the subject matter presented herein may be implemented as a computer process, a computer-controlled apparatus, a computing system, or an article of manufacture, such as a computer-readable storage medium. While the subject matter described herein is presented in the general context of program components that execute on one or more computing devices, those skilled in the art will recognize that other implementations may be performed in combination with other types of program components. Generally, program components include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

Based on the foregoing, it should be appreciated that technologies for operating the systems and implementing the processes have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the subject matter recited in the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

EXAMPLE CLAUSES

A. A system for mitigating an obstruction associated with an autonomous vehicle, the system comprising:

a first sensor coupled to the autonomous vehicle and configured to generate a first signal indicative of an environment in which the first sensor is present;

a surface coupled to the first sensor;

a sensor window coupled to the surface and configured to provide a path through which the first sensor senses the environment;

a vibratory actuator coupled to one or more of the surface or the sensor window to vibrate the sensor window;

a heating element coupled to one or more of the surface or the sensor window and configured to heat the sensor window;

an obstruction detection system comprising an environmental sensor configured to generate an environmental signal indicative of the environment, the obstruction detection system configured to:

receive one or more of the environmental signal or a weather signal indicative of a weather condition; and detect, based at least in part on one or more of the environmental signal or the weather signal, an obstruction associated with the sensor window; and an obstruction mitigation controller configured to initiate activation, based at least in part on detection of the obstruction, of one or more of the vibratory actuator or the heating element to mitigate the obstruction associated with the sensor window, wherein the first sensor is one of an image sensor, a LIDAR sensor, or a time-of-flight (TOF) sensor.

B. The system of example A, wherein the first sensor is configured to generate the first signal at a sensor frequency, and wherein the obstruction mitigation controller is configured to initiate activation of the vibratory actuator based at least in part on the sensor frequency.

C. The system of example A or example B, wherein the obstruction detection system is configured to identify water droplets on the sensor window, and initiate activation of the vibratory actuator at a frequency based at least in part on a size of the water droplets.

D. The system of any one of example A through example C, wherein the obstruction mitigation controller is configured to initiate activation of the vibratory actuator intermittently.

E. The system of any one of example A through example D, further comprising one or more of an active noise reduction actuator or a passive noise suppressor coupled to the surface, the active noise reduction actuator and the passive noise suppressor being configured to reduce noise generated by operation of the vibratory actuator.

F. The system of any one of example A through example E, wherein the environmental sensor comprises the first sensor, and the obstruction mitigation controller comprises a neural network configured to identify the obstruction based at least in part on the first signal.

G. The system of any one of example A through example F, wherein the obstruction detection system is configured to classify, based at least in part on the first signal, an obstruction on the sensor window, and wherein the obstruction mitigation controller is configured to initiate activation, based at least in part on the classification, of one or more of the vibratory actuator or the heating element.

H. The system of any one of example A through example G, wherein the obstruction detection system is configured to compare the first signal to a localization signal of a localization system configured to determine one or more of a position or orientation of the first sensor based at least in part on one or more of a global positioning system, inertial measurement units, a LIDAR sensor, a wheel encoder, or an image capture device, the localization signal comprising an expected representation of the environment.

I. The system of any one of example A through example H, wherein the first signal is indicative of an object detectible in the environment, and the obstruction detection system is configured to:

receive a second signal from a second sensor indicative of the object; and compare the second signal to the first signal to determine a difference between the object detected by the first sensor and the object detected by the second sensor.

J. The system of any one of example A through example I, wherein the first signal comprises a plurality of signals indicative of a scene from the environment, and the obstruction detection system is configured to:

segment the plurality of signals to create a plurality of segmented signals; and identify a segment in the plurality of segmented signals that remains unchanged
relative to the remaining segments in the plurality of segmented signals.

K. The system of any one of example A through example K, wherein:
the environmental sensor comprises one or more of a rain detection sensor, a temperature sensor, a humidity sensor, or a pressure sensor;
the surface comprises a housing; and
the obstruction detection system is configured to detect the obstruction based at least in part on the environmental signal indicative of one or more of rain, an exterior temperature outside the autonomous vehicle, an interior temperature inside the housing, an external humidity outside the autonomous vehicle, an internal humidity inside the housing, an external pressure outside the autonomous vehicle, or an internal pressure inside the housing.

L. An apparatus for mitigating an obstruction associated with a sensor, the apparatus comprising:
a surface configured to receive the sensor, the sensor configured to generate a signal indicative of an environment in which the sensor is present;
a sensor window coupled to the surface and configured to provide a path through which the sensor senses the environment;
a vibratory actuator coupled to one or more of the surface or the sensor window to vibrate of the sensor window;
a heating element coupled to the surface and configured to heat the sensor window; and
an obstruction mitigation controller configured to initiate activation, based at least in part on detection of an obstruction, one or more of the vibratory actuator or the heating element.

M. The apparatus of example L, wherein the vibratory actuator comprises one or more of a voice-coil, a motor, an unbalanced rotational weight, a linear actuator, an ultrasonic transducer, or a rotating magnet.

N. The apparatus of example L or example M, further comprising a diaphragm coupling the sensor window to the surface, wherein the heating element comprises one or more of a metal heating element, a ceramic heating element, a thin-film heating element, an indium tin oxide layer, heat from the sensor, heat from other electronic devices, or hot air.

O. The apparatus of any one of example L through example N, wherein the detection of an obstruction comprises one or more of:
comparing the signal with a second signal generated by a second sensor, a difference between the signal and the second signal indicative of the obstruction;
receiving, from an environmental sensor, an environmental signal indicative of an obstruction;
inputting the signal into a machine learned model configured to output an indication of the obstruction; or receiving, from a teleoperations system and based at least in part on the signal, an indication of the obstruction.

P. The apparatus of any one of example L through example O, wherein the sensor comprises an image capture device operable at a framerate frequency, and wherein the obstruction mitigation controller is configured to initiate activation of the vibratory actuator based at least in part on the framerate frequency.

Q. A method comprising:
receiving a signal generated from a sensor, the signal indicative of an environment in which the sensor is present or an ambient condition associated with the sensors;
detecting, based at least in part on the signal, an obstruction on a sensor window through which the sensor senses the environment; and
initiating, based at least in part on the detection of the obstruction, one or more of vibration of the sensor window to mitigate the obstruction or heating of the sensor window to mitigate the obstruction.

R. The method of example Q, wherein detecting the obstruction comprises one or more of:
comparing the signal with a second signal generated by a second sensor, a difference between the signal and the second signal indicative of the obstruction;
receiving, from an environmental sensor, an environmental signal indicative of an obstruction;
inputting the signal into a machine learned model configured to output an indication of the obstruction; or
receiving, from a teleoperations system and based at least in part on the signal, an indication of the obstruction.

S. The method of example Q or example R, wherein the first sensor is disposed on an autonomous vehicle, and the method further comprises:
sending the signal to a teleoperations system configured to assist with operation of the autonomous vehicle; and
receiving, from the teleoperations system, a command signal configured to cause the autonomous vehicle to navigate to a vehicle service center.

T. The method of any one of example Q through example S, wherein the sensor is configured to receive the signal indicative of the environment at a sensor frequency, and the method further comprises initiating the vibration, based at least in part on the sensor frequency.

What is claimed is:
1. A system for mitigating an obstruction associated with an autonomous vehicle, the system comprising:
a first sensor coupled to the autonomous vehicle and configured to generate a first signal indicative of an environment in which the first sensor is present;
a housing comprising a surface coupled to the first sensor;
a sensor window coupled to the surface and configured to provide a path through which the first sensor senses the environment;
a vibratory actuator coupled to one or more of the surface or the sensor window to vibrate the sensor window;
a heating element disposed in the housing, coupled to one or more of the surface or the sensor window, and configured to heat the sensor window;
an obstruction detection system comprising an environmental sensor configured to generate an environmental signal indicative of the environment, the obstruction detection system configured to:
receive one or more of the environmental signal or a weather signal indicative of a weather condition; and
detect, based at least in part on one or more of the environmental signal or the weather signal, an obstruction associated with the sensor window; and
an obstruction mitigation controller configured to initiate activation, based at least in part on detection of the obstruction, of the vibratory actuator or the heating element to mitigate the obstruction associated with the sensor window, wherein the first sensor is one of an image sensor, a LIDAR sensor, or a time-of-flight (TOF) sensor, wherein the obstruction detection system is configured to cause the first sensor to generate the first signal at a sensor frequency, and cause the obstruction mitigation controller to initiate activation of the vibratory actuator based at least in part on the sensor frequency to minimize interference with sensor mea- surements, wherein the interference with sensor measurements is associated with moving reflections resulted from activation of the vibratory actuator.

2. The system of claim 1, wherein the obstruction detection system is configured to identify water droplets on the sensor window, and initiate activation of the vibratory actuator at a frequency based at least in part on a size of the water droplets.

3. The system of claim 1, further comprising one or more processors and memory, the memory storing instructions that when executed cause the obstruction mitigation controller to initiate activation of the vibratory actuator intermittently.

4. The system of claim 1, further comprising one or more of an active noise reduction actuator or a passive noise suppressor coupled to the surface, the active noise reduction actuator and the passive noise suppressor being configured to reduce noise generated by operation of the vibratory actuator.

5. The system of claim 1, wherein the environmental sensor comprises the first sensor, and the obstruction mitigation controller comprises a neural network configured to identify the obstruction based at least in part on the first signal.

6. The system of claim 1, wherein the obstruction detection system is configured to classify, based at least in part on the first signal, an obstruction on the sensor window, and
wherein the obstruction mitigation controller is configured to initiate activation, based at least in part on classification, of one or more of the vibratory actuator or the heating element.

7. The system of claim 1, further comprising one or more processors and memory, the memory storing instructions that when executed cause the obstruction detection system to compare the first signal to an expected value of a localization signal, wherein detection of the obstruction is based at least in part on a difference between the first signal and the expected value of the localization signal.

8. The system of claim 1, wherein the first signal is indicative of an object detectible in the environment, and the obstruction detection system is configured to:
receive a second signal from a second sensor indicative of the object; and
compare the second signal to the first signal to determine a difference between the object detected by the first sensor and the object detected by the second sensor.

9. An apparatus for mitigating an obstruction associated with a sensor, the apparatus comprising:
a housing configured to receive the sensor, the sensor configured to generate, at a sensor frequency, a signal indicative of an environment in which the sensor is present;
a sensor window coupled to a surface of the housing and configured to provide a path through which the sensor senses the environment;
a vibratory actuator coupled to one or more of the surface or the sensor window to vibrate of the sensor window;
a heating element disposed in the housing and coupled to the surface or the sensor window and configured to heat the sensor window; and
an obstruction mitigation controller configured to initiate activation, based at least in part on detection of an obstruction, of the vibratory actuator, wherein the obstruction mitigation controller is configured to initiate activation of the vibratory actuator based at least in part on the sensor frequency to mitigate interference with sensor measurements, wherein the interference with sensor measurements is associated with moving reflections resulted from activation of the vibratory actuator.

10. The apparatus of claim 9, wherein the vibratory actuator comprises one or more of a voice-coil, a motor, an unbalanced rotational weight, a linear actuator, an ultrasonic transducer, or a rotating magnet.

11. The apparatus of claim 9, further comprising a diaphragm coupling the sensor window to the surface, wherein the heating element comprises one or more of a metal heating element, a ceramic heating element, a thin-film heating element, an indium tin oxide layer, heat from the sensor, heat from other electronic devices, or hot air.

12. The apparatus of claim 9, wherein the detection of the obstruction comprises one or more of:
comparing the signal with a second signal generated by a second sensor, a difference between the signal and the second signal indicative of the obstruction;
receiving, from an environmental sensor, an environmental signal indicative of an obstruction;
inputting the signal into a machine learned model configured to output an indication of the obstruction; or
receiving, from a teleoperations system and based at least in part on the signal, an indication of the obstruction.

13. The apparatus of claim 9, wherein the sensor comprises an image capture device operable at a framerate frequency, and
wherein the obstruction mitigation controller is configured to initiate activation of the vibratory actuator based at least in part on the framerate frequency.

14. A method comprising:
receiving a signal generated from a sensor at a sensor frequency, the signal indicative of an environment in which the sensor is present or an ambient condition associated with the sensor;
detecting, based at least in part on the signal, an obstruction on a sensor window of a housing through which the sensor senses the environment; and
initiating, based at least in part on the detection of the obstruction, activation of a vibratory actuator disposed within the housing based at least in part on the sensor frequency to mitigate interference with sensor measurements, wherein the interference with sensor measurements is associated with moving reflections resulted from activation of the vibratory actuator.

15. The method of claim 14, wherein detecting the obstruction comprises one or more of:
comparing the signal with a second signal generated by a second sensor, a difference between the signal and the second signal indicative of the obstruction;
receiving, from an environmental sensor, an environmental signal indicative of an obstruction;
inputting the signal into a machine learned model configured to output an indication of the obstruction; or
receiving, from a teleoperations system and based at least in part on the signal, an indication of the obstruction.

16. The method of claim 14, wherein the sensor is disposed on an autonomous vehicle, and the method further comprises:
sending the signal to a teleoperations system configured to assist with operation of the autonomous vehicle; and
receiving, from the teleoperations system, a command signal configured to cause the autonomous vehicle to navigate to a vehicle service center.

17. The system of claim 6, wherein the obstruction detection system is further configured to detect an obstruction type based at least in part on the first signal, and wherein the obstruction mitigation controller is further configured to initiate activation of at least one of the vibratory actuator or the heating element based on the obstruction type.

18. The apparatus of claim 9, wherein the obstruction mitigation controller is further configured to detect an obstruction type based at least in part on the signal and initiate activation of at least one of the vibratory actuator or the heating element based on the obstruction type.

19. The method of claim 14, further comprises:
   detecting, based at least in part on the signal, an obstruction type; and
   initiating, based on the obstruction type, activation of at least one of the vibratory actuator or the heating element.

\* \* \* \* \*